United States Patent
Wasserfallen et al.

(10) Patent No.: US 9,539,610 B2
(45) Date of Patent: Jan. 10, 2017

(54) METHOD FOR COATING SURFACES AND USE OF THE OBJECTS COATED USING SAID METHOD

(75) Inventors: Daniel Wasserfallen, Mainz (DE); Martin Droll, Schlangen (DE); Oliver Seewald, Marsberg (DE); Wolfgang Bremser, Paderborn (DE); Michael Schwamb, Frankfurt (DE); Cindy Ettrich, Frankfurt am Main (DE); Vera Sotke, Frankfurt (DE)

(73) Assignee: Chemetall GmbH (DE)

( * ) Notice: Subject to any disclaimer, the term of this patent is extended or adjusted under 35 U.S.C. 154(b) by 3 days.

(21) Appl. No.: 13/820,591

(22) PCT Filed: Sep. 12, 2011

(86) PCT No.: PCT/EP2011/065759
§ 371 (c)(1),
(2), (4) Date: Sep. 17, 2013

(87) PCT Pub. No.: WO2012/034974
PCT Pub. Date: Mar. 22, 2012

(65) Prior Publication Data
US 2014/0004266 A1    Jan. 2, 2014

(30) Foreign Application Priority Data
Sep. 13, 2010   (DE) .................. 10 2010 040 651

(51) Int. Cl.
  *B05D 3/00*    (2006.01)
  *B05D 7/14*    (2006.01)
  (Continued)

(52) U.S. Cl.
  CPC .............. *B05D 3/002* (2013.01); *B05D 7/142* (2013.01); *B05D 7/16* (2013.01); *B05D 7/51* (2013.01);
  (Continued)

(58) Field of Classification Search
  CPC ....................................................... B05D 1/18
  See application file for complete search history.

(56) References Cited

U.S. PATENT DOCUMENTS 3,989,597 A * 11/1976 Lee et al. ................. 435/174
4,775,725 A   10/1988 DePasquale et al.
(Continued)

FOREIGN PATENT DOCUMENTS

CN   1124301 A    6/1996
CN   1735729 A    2/2006
(Continued)

OTHER PUBLICATIONS

Shi, et al. "Polyelectrolyte multilayer nanoreactors toward the synthesis of diverse nanostructured materials", J. Prog. Polym. Sci. 29 (2004), pp. 987-1019.

*Primary Examiner* — Nathan T Leong
(74) *Attorney, Agent, or Firm* — Jeremy J. Kliebert

(57) ABSTRACT

A method for electroless coating of a substrate by applying an activating coat of polyelectrolyte or salt with a first aqueous composition, rinsing of the activating coat such that the activating coat is not entirely removed The activated surface that has remained after rinsing is then contacted with an aqueous composition in the form of a solution, emulsion or suspension to form an organic secondary coat (precipitation coat), and drying. The activating coat contains at least one cationic polyelectrolyte or at least one cationic salt in solution in water. The aqueous composition which forms the secondary coat contains constituents which can be precipitated, deposited and/or salted out and which are anionically, zwitterionically, sterically or cationically stabilized. The dry film formed in the process, which is made of the activating coat and the secondary coat, has a thickness of at least 1 μm.

9 Claims, 4 Drawing Sheets

(51) Int. Cl.
*B05D 7/16* (2006.01)
*B05D 7/00* (2006.01)
*C09D 5/08* (2006.01)
*C23C 18/54* (2006.01)
*C25D 13/00* (2006.01)
*B05D 1/18* (2006.01)

(52) U.S. Cl.
CPC ............... *C09D 5/088* (2013.01); *C23C 18/54* (2013.01); *C25D 13/00* (2013.01); *B05D 1/18* (2013.01); *B05D 7/54* (2013.01); *Y10T 428/24975* (2015.01); *Y10T 428/265* (2015.01)

(56) References Cited

U.S. PATENT DOCUMENTS

| | | | |
|---|---|---|---|
| 5,660,883 A | | 8/1997 | Omura |
| 5,705,219 A | * | 1/1998 | Besenhard et al. ........... 205/125 |
| 5,885,647 A | | 3/1999 | Larm et al. |
| 6,794,042 B1 | | 9/2004 | Merlin et al. |
| 6,881,448 B1 | | 4/2005 | Hattori |
| 7,585,494 B2 | | 9/2009 | Lange et al. |
| 7,862,862 B2 | | 1/2011 | Cui |
| 8,455,673 B2 | | 6/2013 | Cui |
| 2003/0127209 A1 | | 7/2003 | Sandberg et al. |
| 2004/0137239 A1 | * | 7/2004 | Klos et al. ................... 428/446 |
| 2008/0166317 A1 | | 7/2008 | Keller et al. |
| 2011/0212326 A1 | | 9/2011 | Ettrich et al. |
| 2012/0128885 A1 | | 5/2012 | Dornbusch |

FOREIGN PATENT DOCUMENTS

| | | |
|---|---|---|
| DE | 195 96 551 A1 | 6/1996 |
| DE | 10 2008 043682 A1 | 5/2010 |
| JP | S61-272387 A | 12/1986 |
| JP | S62-502900 A | 11/1987 |
| JP | H04-359033 A | 12/1992 |
| JP | H10-510728 A | 10/1998 |
| JP | 2001-191025 A | 7/2001 |
| JP | 2004-262143 A | 9/2004 |
| JP | 2008-274057 A | 11/2008 |
| JP | 2008-540753 A | 11/2008 |
| JP | 2009-523608 A | 6/2009 |
| JP | 2009-209025 A | 9/2009 |
| JP | 2010-003711 A | 1/2010 |
| WO | 98/31719 A1 | 7/1998 |
| WO | 2010/088946 A1 | 8/2010 |

* cited by examiner

METHOD FOR COATING SURFACES AND USE OF THE OBJECTS COATED USING SAID METHOD

This application is a §371 of International Application No. PCT/EP2011/065759 filed Sep. 12, 2011, and claims priority from German Patent Application No. 10 2010 040 651.1 filed Sep. 13, 2010.

The present application claims the priority of DE 102010040651.1 of Sep. 13, 2010. The priority document is incorporated by reference in its entirety into the present disclosure.

All of the documents cited in the present application are incorporated by reference in their entirety into the present disclosure.

The invention relates to a method for coating surfaces, to a corresponding coating, and to the use of the objects coated by said method.

Numerous techniques exist for generating homogeneous coatings on surfaces, especially metallic surfaces, and preferentially by means of dipping processes. The compositions used in such techniques, particularly for the production of anticorrosion coatings, primer coatings and/or electrodeposition coats, are compositions consisting primarily of an organic matrix and/or of organic and/or inorganic additive components, and the technologies utilized are preferably as follows: in order to generate coatings which are very impervious, anticorrosion coatings with a dry film thickness of at least 3 µm are desired, which are applied as thickly as possible in one process step. Anticorrosion coatings of these kinds may be used in particular as primers or as an electrolessly applied deposition coating, particularly in the form of a dispersion, which is utilized like an electrodeposition coating.

PRIOR ART

The conventional electroless processes are based on the utilization of the rheological properties of the formulations used, to achieve complete coating of a workpiece. Although the accumulation of coating material at critical locations can be reduced by continuously rotating the workpiece in question after the dipping operation, that technique does not allow a homogeneous coating with a uniform thickness to be obtained. The reason is that, during the drying and/or crosslinking operation, at locations with relatively high proportions of coating, defects such as blisters and pops may occur, adversely affecting the quality of the overall coating.

The electrophoretic processes avoid these problems by using electrical current, with charged particles that are dispersed or colloidally dissolved in liquid undergoing migration in the electrical field. In this way, success is achieved in depositing a uniform coating by dipping, and in applying, for example, an electrocoat. The production of homogeneous coatings on metallic workpieces is accomplished by this technique. The coatings deposited exhibit extremely good adhesion in the wet state to the metallic substrate, allowing the workpiece to be handled without detachment of the coating in a downstream rinsing step. As a result of this, the amount of aqueous composition and the coat thickness of the resultant coating can be applied uniformly, even in workplace depressions and locations that are difficult to access, and hence it is possible for fewer defects to occur during the drying operation.

With all of these processes, an excessive amount of liquid of aqueous composition may accumulate in depressions and may be transferred to the downstream process step. The electrophoretic processes have the disadvantage that, in addition to the amount of electrical energy required and in addition to suitable dipping baths, leading to an increase in the costs, there are also instances of edge holidays, since electrical fields are built up unevenly at edges, and the edges are coated non-uniformly and possibly even incompletely. Moreover, cavities ought to be avoided in the construction of the workpieces, since at these locations an effect occurs which is comparable with the Faraday cage phenomenon. Owing to the reduced electrical field strength at such locations, insufficient for depositing an adequate amount of solids in such areas, either no coating is formed on the workpiece, or the coating that is formed is of substantially lower thickness, particularly at undercuts (throwing power problem), leading to a marked impairment in the quality of the coating. Additionally, in the case of electrical deposition coating, such as for a cathodic electrocoat, for example, the electrophoretic processes have the following disadvantages: a corresponding dip bath, together with all of the electrical and mechanical installations for temperature control, power supply, and electrical insulation, with circulating means, with addition means, and before the disposal of the anolyte acid formed in the course of electrolytic coating, and with ultrafiltration for paint recovery (recycling), and also with control devices, has a very costly and complicated construction. The operating regime involves a very high level of technical complexity, not least on account of the high current strengths and energy quantities, in evening out the electrical parameters over the volume of the bath, in the precise setting of all of the operational parameters, and in the maintenance and cleaning of the system.

The known autophoretic processes are based on electroless self-deposition, wherein, in a pickling attack, metal ions are removed from a surface, particularly a metallic surface, and wherein the concentration of ions, such as of divalent, cationic ions, for example, such as, more particularly, of iron ions and/or zinc ions at the resultant interface, results in precipitation and/or deposition of an emulsion and/or suspension. Although the autophoretic processes do not have the disadvantages of the electrophoretic processes in terms of the Faraday cage effect, the coatings produced in the known autophoretic processes have to be fixed after the first activating step, in a costly and inconvenient multistage dipping process. Moreover, the pickling attack leads to an unavoidable contamination of the active zone, particularly of a dip-coating or spray-coating system, with metal ions, which must be removed from the affected zones using, for example, an ion exchanger. Moreover, the technique is based on a chemical deposition process which is not self-regulating and cannot be discontinued as and when required, such as by switching off the electrical current in the case of the electrophoretic processes, for example. Accordingly, on prolonged residence time of the metallic substrates in the active zones, the development of an excessive coat thickness is unavoidable.

It is a long-pursued desire to form a coating of very great homogeneity and extremely uniform thickness in a dipping process, efficiently and cost-effectively, with an aqueous composition such as a dispersion or a paint formulation, in an extremely simple production process. The reason is that to date there has been a lack of extremely simple methods for forming such an organic coating, in which a coating is deposited electrolessly in one process step and, after drying, has a dry film thickness of more than 5 µm, without any ions removed from the substrate material being used to form the secondary coat. Furthermore, the multi-metal capacity represents a further distinguishing feature of the present invention. In that case the ions removed are in fact used, but an activating coat applied beforehand is not.

Problem

The problem which exists is therefore that of proposing a method by which organic coatings can be generated on surfaces, especially metallic surfaces, in an electroless deposition process, via a liquid system, said coatings being developed in a rinse-resistant form as and when required. For this purpose, preferably, a dispersion and/or paint formulation is to be used as an aqueous composition. The coating is to be applied extremely homogeneously and with maximum surface coverage. It is to be deposited simply in—as far as possible—one process step. It will be advantageous if in such a method it were possible to apply a coating producing a dry film of at least 8 µm or at least 10 µm in thickness. It would also be advantageous if this coating were able to serve as a replacement for an electrocoat. A further problem was that of proposing an extremely simple multistage method for producing the coating.

Solution

The problem is solved with a method for electroless coating of substrates, comprising or consisting of the following steps:
  I. provision of a substrate,
  II. optional cleaning of the substrate,
  III. application of an activating coat of polyelectrolyte and/or salt with a first aqueous composition (=activating agent),
  IV. optional intermediate drying of the activating coat,
  V. rinsing of the activating coat, the activating coat not being entirely removed,
  VI. contacting and coating of the activated surfaces that have remained after rinsing, with an aqueous composition in the form of a solution, emulsion and/or suspension, to form an organic secondary coat (=precipitation coat),
  VII. optional rinsing of the secondary coat, and
  VIII. optional drying of the secondary coat,
wherein an activating coat is formed with an aqueous activating agent in the form of a solution, emulsion and/or suspension which comprises a) at least one cationic polyelectrolyte and/or at least one cationic salt in solution in water, or b) at least one anionic polyelectrolyte and/or at least one anionic salt in solution in water, wherein the aqueous composition to form a secondary coat has constituents which can be precipitated, deposited and/or salted out and which are anionically, zwitterionically, sterically and/or cationically stabilized, where anionically and cationically stabilized constituents in the aqueous composition do not adversely affect one another, and wherein the dry film formed in this procedure or subsequently, comprising the secondary coat or comprising the activating coat and the secondary coat, has a thickness of at least 1 µm, and the methods and uses described later on below, and also the preferred and/or advantageous embodiments thereof.

DEFINITIONS OF TERMS

For the purposes of the present invention, the term "and/or" includes not only any particular element but also all combinations of the elements recited in the listing in question.

For the purposes of the present invention, all quantity figures, unless otherwise indicated, should be understood as figures by weight.

The term "solids and active ingredients" indicates that as well as the solids that are firmly present in a liquid composition there may also be other substances present, which here are called active ingredients and which become solids only as a result of a chemical reaction or of changes in chemical and/or physical conditions, and which therefore participate, for example through their bonded chemical groups, in the formation of a solid coating.

For the purposes of the present invention, the term "room temperature" denotes a temperature in the range from 15 to 28° C.

The term "pretreatment" denotes a treatment (=contacting of the surfaces that are to be coated with a composition, typically a liquid composition), to which subsequently, optionally after subsequent coating, a further coating is applied, such as at least one paint, for example, for the purpose of protecting the coat sequence and the object.

The term "solution" also embraces colloidal solutions in the sense of the description given under the heading "Colloid chemistry" in the Römpp Lexikon Chemie chemical dictionary.

The term "electroless coating" in the sense of this specification means that for the coating of substrates with a composition comprising solution and/or dispersion (=suspension and/or emulsion)—in contrast to the known electrophoretic methods—to form an activating coat and/or a secondary coat, either no electrical voltage is applied from the outside or, in the case of a largely electroless embodiment of the coating, a small electrical auxiliary voltage is applied, which assists the method and possibly improves the coat that is formed in the method, but does not initiate precipitation or reaction.

The term "surface(s) to be coated" for the purposes of this specification denotes surfaces of objects, and especially of metallic and/or organic objects, which may have been precoated optionally, for example, with a metallic coating such as a coating based on zinc or zinc alloy, for example, and/or with at least one coating of a pretreatment or treatment composition based for example on chromate, $Cr^{3+}$, complex fluorides, Ti compounds, Zr compounds, silane/silanol/siloxane, polysiloxane, organic polymer/copolymer and/or reaction products thereof. In certain embodiments surfaces of metallic and/or organic objects and/or materials are coated on the same component and/or in succession or simultaneously in the same unit. In the case of a single vehicle body, for example, plastics surfaces and metallic surfaces may occur at the same time, and/or metallic surfaces made of different metallic materials may occur at the same time, such as of steel, galvanized steel and/or aluminum alloy, for example. It is also possible for a mix of different materials to be coated in one coating unit.

The term "silane" also embraces the resultant silanols and siloxanes, and hence the term "silane/silanol/siloxane" is used as well. Whereas silanols form in contact with moisture and water, siloxanes may form from them in water and on drying.

The term "activating coat" for the purposes of this specification relates to the coating which is formed with the activating agent, in the wet, dried and/or crosslinked state. This includes the wet film of the activating agent, of the partially dried film, of the fully dried film and of the film dried, if desired, at elevated temperature, of the optionally chemically modified film, of the film optionally fixed with a fixing aid, and of the film optionally crosslinked further by irradiation and/or thermally. Activating substances used in the activating agent are, in particular, polyelectrolytes and/or salts.

"Activating" refers to the capacity, in a downstream method step such as a dipping step, for example, to cause a stable aqueous solution and/or dispersion, close to the surface of the activating coat, to undergo precipitation, salting out and/or precipitation of activating substances. In the context of the method of the invention, this is a prerequisite for a secondary coat to be able to be formed on the activating coat, on the remaining activating coat and/or on the substrate freed largely or partially from activating agent.

The term "polyelectrolytes" in the context of this specification describes water-soluble, anionic or cationic compounds, usually of high chain length, which may contain a chain, a backbone and/or a dendrimer, more particularly in the form of branched and/or linear polymers and/or copolymers, and which may have molecular weights in particular in the range from 200 g/mol to 20 million g/mol.

The terms "latently anionic" and "latently cationic" denote ionic behaviors which are partially concealed and/or which occur temporarily. This includes substances having strongly polarizing groups such as alcohols, which, although not ionic by definition, may initiate a precipitation in the sense of the specification, such as polyvinyl alcohols or polyethylene glycols, for example.

The terms "permanently anionic" and "permanently cationic" denote ionic behaviors which occur and/or are apparent. Apparent here, for the purposes of this specification, denotes compounds or atoms which possess ions or which are per se such an ion (e.g., metal salts). Generally speaking, in the present text, no distinction is made between latent and permanent behavior.

The term "rinse-resistant" for the purposes of this specification means that under the conditions of the respective unit and method sequence, the last coating in each case, such as a) an activating coat and/or b) a secondary coat, for example, is not removed entirely by a rinsing operation (=rinsing) and hence in the case of a) its activating effect for the subsequent coating or in the case of b) the secondary coat produced by precipitation, coagulation, salting-out and/or deposition, is not removed entirely. In this way it is possible, for example, to produce an optionally dried coating, preferably an impervious coating.

The terms "precipitation" and "precipitation reaction" for the purposes of this specification describe chemical reactions in which the reactants are present in dispersion and/or solution in a solvent such as water in particular, and where at least one reaction product is insoluble or of low solubility in said solvent.

In the case of precipitation, stabilization is eliminated.

The term "coagulation" for the purposes of this specification describes the aggregation of particles, in other words the at least one partial elimination of colloidal states and/or of states of ultrafine distribution, such as the settling-out and/or caking especially of colloidal, suspended and/or emulsified substances, chemocoagulation through acids or alkalis, the precipitation of ampholytes at the isoelectric point, and/or the precipitation of substances by means of ultrasound coagulation. Coagulation is often a component step in the deposition of precipitation products and very fine particles.

The term "deposition" relates in particular to a downward movement and sedimentation of particles which are already present in the aqueous composition. Deposition can be intensified by coagulation of particles and may also affect colloidal particles, precipitations and/or the formation of a deposit.

The term "salting out" for the purposes of this specification describes the formation of salt by formation of a usually crystalline precipitation product and/or deposit.

The term "formulation" encompasses multicomponent mixtures in the form of aqueous compositions which have a specific constitution and as a paint formulation, for example, are tailored for particular properties.

The term "polymer(s)" for the purposes of this specification denotes oligomer(s), polymer(s), and copolymer(s), mixtures thereof, and in particular as well the compounded forms thereof on an organic and/or largely organic basis. For the purposes of this specification, the "polymer(s)" is or are typically present wholly or primarily in the form of polymer(s) and/or copolymer(s).

The term "copolymers" for the purposes of this specification describes polymers which are composed of two or more different kinds of monomer units. In this context it is possible to subdivide copolymers into five classes, as illustrated for a binary copolymer synthesized from two different comonomers A and B:
1. random copolymers, in which the distribution of the two monomers in the chain, in the backbone and/or in the dendrimer is arbitrary (AABABBBABAABBBABBA-BAB . . . );
2. gradient copolymers, in principle similar to the random copolymers, but with a varying fraction of a monomer in the profile of the chain, the backbone and/or the dendrimer (AAAAAABAABBAABABBBAABBBBBB);
3. alternating copolymers, with a regular arrangement of the monomers along the chain, the backbone and/or the dendrimer (ABABABABABABABABABAB . . . );
4. block copolymers, consisting of relatively long sequences or blocks of each monomer (AAAAAAAAABBBBBBBBBBBB . . . ), also referred to, in accordance with the number of blocks, as diblock, triblock, multiblock copolymers;
5. graft copolymers, in which blocks of one monomer have been grafted onto the blocks, the chain, the backbone and/or the dendrimer of another monomer.

The term "derivatives" for the purposes of this specification denotes a derived substance of similar structure to a corresponding parent substance. Derivatives are substances whose molecules, instead of at least one H atom or at least one functional group, possess at least one different atom or at least one different group of atoms, and/or in which one or more atoms/groups of atoms have been removed.

The expression "(meth)acryl . . . " for the purposes of the present invention is intended to encompass methacryl . . . , acryl . . . and/or mixtures of both.

The term "compounded particles" identifies particles which are composed of different substances and often have an especially optimized composition.

The term "water-insoluble particles" for the purposes of this specification means that the water-solubility of the particles is so low that there is no passage of individual constituents of the particles, such as the stabilization attaching to the particle surface, and/or small amounts of the substance of the particles, into the aqueous phase at room temperature, or there is such passage but only up to 10% by weight, preferably up to 5% by weight, up to 2% by weight, or up to 1% by weight, within a day. These water-insoluble particles also include "stabilized particles" where the stabilization is present and/or takes place in the aqueous phase. The stabilization on the particle surface may be established for example with a nonionic and/or ionic emulsifier, with ions, with a flow control agent and/or with a thickener.

The term "long-chain" for the purposes of the present invention encompasses carbon chains with 4 or more, preferably four to 20, more particularly six to 18, carbon atoms.

DETAILED DESCRIPTION

For the purposes of the present invention, in methods for coating surfaces of objects which may optionally have been precoated (=surfaces to be coated), the surfaces to be coated are first activated with an activating agent. Here, with the activating agent on the surfaces to be coated, a rinse-resistant layer (=activating coat) is formed with a first aqueous composition, preferably with a stable aqueous composition in the form of a solution and/or dispersion (=suspension and/or emulsion). Here, by means for example of cationic or anionic precipitation potential, a precipitation reaction, a coagulation, a salting-out of substances present in solution in a solvent, and/or a deposition of particles and/or of colloidal, ultrafine and/or fine particles, is induced. Then a second, optionally rinse-resistant layer (=secondary coat=precipitation coat) is formed on the surface that is activated (=coated with activating substance). Since in this case it is possible for polyvalent ions and/or molecules having two or more anionic or two or more cationic functions (polyfunctional molecules) to have a higher precipitation potential and to coagulate to a greater extent than monovalent anions, than monovalent cations and/or than monofunctional molecules, the former are preferred in an activating agent. This applies to oppositely charged ions and molecules in an electrolyte.

Surprisingly it has been found that even anionic polyelectrolytes can lead to the precipitation of an anionically stabilized dispersion. Surprisingly it has been found that, conversely, cationic polyelectrolytes as well may lead to the precipitation of a cationically stabilized dispersion.

The method of the invention may preferably be distinguished by the fact that the ions, complexes and/or compounds of the activating coat may diffuse into the aqueous composition to form the secondary coat, and/or may interact and/or react, and/or that the first coat (=activating coat) is at least partly dissolved and/or detached, it not being absolutely necessary for material of the first coat to be taken up into the secondary coat.

In the method of the invention, the second aqueous composition to form a secondary coat (=precipitation coat) may preferably comprise at least one precipitable substance, at least one kind of depositable particle and/or at least one depositable compound.

In individual embodiments of the invention, to form an activating coat, it is possible preferably, additionally, for an auxiliary voltage, more particularly of less than 100 V, to be applied, the auxiliary voltage bringing about ion migration, but not initiating precipitation, not initiating deposition and/or not initiating salting out. This auxiliary voltage may accelerate the formation of the activating coat and/or may improve coat quality.

In the method of the invention, the at least one precipitable substance, the at least one kind of depositable particles and/or the at least one depositable compound is able preferably to enter into a precipitation reaction and/or a salting-out reaction with the ions, complexes and/or compounds of the activating coat, forming a secondary coat of precipitated and/or deposited substances on the activating coat.

In one preferred method of the invention, the secondary coat may be filmed and/or crosslinked, the secondary coat may be treated chemically and/or thermally, in order to apply and/or fix the substances on the substrate, and/or the secondary coat may be further coated.

The objects to be coated may be objects made of any desired material. The objects preferably have surfaces of metal, alloy, plastic, composite material, natural material, glass and/or ceramic. Serving as objects may also be any metallic objects requiring protection from corrosion. The objects may in principle, however, be any objects comprising in each case at least one plastic, composite material, natural material, glass, ceramic and/or metallic material, and also combinations thereof, which optionally are already coated and/or which now are to be coated. For example, plastics elements intended, for example, for vehicle bodies, fenders, appliances, and buildings can be coated in accordance with the invention. Elements made from metallic materials may also have been joined to elements made from other materials, such as plastic, for example.

As surfaces or substrates it is possible in principle in step I. to use surfaces of all kinds of materials—optionally also those of two or more different kinds of materials adjacently and/or successively in the method of the invention. Among the metallic materials, all kinds of metallic materials are possible in principle, more particularly those of aluminum, iron, copper, magnesium, titanium, zinc, tin and/or alloys thereof containing aluminum, iron, steel, copper, magnesium, nickel, titanium, zinc and/or tin. The surfaces of the materials may optionally also be and/or have been precoated, with zinc or with an alloy containing aluminum and/or zinc, for example. The metallic substrate may optionally have been joined to a plastics component.

As objects to be coated it is possible in principle to use all kinds of objects, more particularly those comprising at least one metallic material and/or those having at least one metallic coating.

Particularly preferred objects are, in particular, strips (coils), sheets and panels, parts such as small parts, for example, joined components, components of complex shape, profiles, rods and/or wires made of metal and/or alloy.

In various embodiments the substrates have been precoated—for example, with at least one coating of at least one metallic, nonmetallic-inorganic or organic coating, as for example a hot-dip galvanizing, zinc-alloying or aluminum-alloying coat, with at least one pretreatment coat based, for example, on phosphate, silane/silanol/siloxane, titanium compound and/or zirconium compound, with at least one electrolytically applied coating, such as an anodizing coat, for example, with at least one subsequently applied coat for sealing and/or modifying the coating present beneath it, with at least one organic coating, such as a primer coat and/or a paint coat, for example. On organic substrates as well, for example, it is possible for example to apply at least one coating, such as an antistatic coat, metallic coat, paint coat and/or sealing coat, for example.

In the case of a prior pretreatment before activation of a surface with an activating agent, the surfaces to be treated may if required be first subjected to alkaline cleaning, acid pickling and/or water rinsing, and may optionally be contacted with a composition for pretreatment, the latter more particularly for the purpose of forming a conversion coat. The surfaces thus treated and/or coated may then be coated optionally with a primer and/or with an optionally formable protective coat, more particularly with an anticorrosion primer, and/or may optionally be oiled. Oiling is used in particular for temporary protection of the treated and/or coated surfaces, especially metallic surfaces, when, for example, these surfaces are to undergo temporary storage.

Any kind of pretreatment is possible in principle: for example it is possible to use aqueous pretreatment compositions based on phosphate, phosphonate, silane/silanol/siloxane, polysiloxane, lanthanide compound, titanium compound, hafnium compound, zirconium compound, zinc particles, acids such as vinylphosphonic acids, metal salt, waterglass and/or organic polymer.

In many embodiments it is necessary first to clean the surfaces of metallic substrates and/or of metallic coatings, by means for example of an alkaline cleaning such as degreasing, for example, and/or by means of acid pickling, with a subsequent rinse with water. If a metallic substrate is freshly manufactured and/or if a metallic coating is freshly applied, there is generally no need for cleaning. On the other hand it is advisable in numerous embodiments, including other kinds of surfaces, such as those of plastics, for example, to carry out cleaning, to remove dirt and dust, for example, and optionally to carry out antistatic treatment.

The activation serves to prepare the substrates that are to be coated with a secondary coat, and the at least one activating substance in the activating coat, or in the activating coat which remains after rinsing, contributes to the precipitation, salting-out and/or deposition of particles, thereby forming a secondary coat. In numerous embodiments it is desired for the secondary coat to have a very high dry film thickness and to be formed as far as possible in one process step.

With the method of the invention at least one activating coat is formed with the aqueous activating agent that comprises at least one activating substance. The activating coat is preferably rinse-resistant.

Each activating coat can be formed in particular with an aqueous activating agent based on cationic and/or anionic polyelectrolytes and/or on cationic or anionic salts.

The activating agent and/or the activating coat formed from it comprises/comprise as activating substance(s) at least one polyelectrolyte, at least one chemically modified polyelectrolyte, at least one inorganic salt, at least one organic salt, at least one complexing agent, at least one complex, at least one acid and/or at least one base, these constituents not adversely affecting one another. The at least one activating substance acts preferably as a precipitating agent, as a salting-out agent and/or as an agent for deposition.

The polyelectrolytes here are preferably water-soluble anionic or cationic compounds with usually a high chain length. More particularly they are an organic polymer and/or copolymer which has a chain, a backbone and/or a dendrimer. In many embodiments they are branched and/or linear polymers and/or branched and/or linear copolymers. The polyelectrolytes often have molecular weights in the range from 200 g/mol to 20 million g/mol, preferably in the range from 500 g/mol to 12 million g/mol, from 2000 g/mol to 8 million g/mol, or from 12 000 g/mol to 5 million g/mol, more preferably in the range from 50 000 g/mol to 3 million g/mol or from 200 000 g/mol to 2 million g/mol. In certain embodiments the polyelectrolytes may have molecular weights in the range from 1000 to 800 000 g/mol, from 8000 to 300 000 g/mol, or from 30 000 to 150 000 g/mol. In certain other embodiments the polyelectrolytes may have molecular weights in the range from 12 000 to 16 000 000 g/mol, from 28 000 to 14 000 000 g/mol, from 80 000 to 9 500 000 g/mol, or from 120 000 to 7 000 000 g/mol.

In this context it may be useful in the case of highly water-soluble polyelectrolytes to take measures to improve the rinse resistance, by chemical modification of the polyelectrolyte, by the addition of a fixing aid such as an adhesion promoter and/or thickener, for example, with an intermediate drying procedure, and/or with crosslinking of the polyelectrolyte, for example. Particular preference is given to intermediate drying prior to rinsing, especially when the cationic polyelectrolytes have not been chemically modified and when no other measures are taken to raise the rinse-resistance.

If the polyelectrolyte used is a chitosan or a chitosan modified chemically with silane/silanol/siloane, for example, it is preferred for the pH of the aqueous composition to be in the range from 1.5 to 12, preferably from 2 to 7 or from 3 to 6, for its concentration to be in the range from 0.001% to 2% by weight, preferably in the range from 0.01% to 1.5% by weight or from 0.05% to 1% by weight, and/or for the molecular weight of the chitosan to be in the range from 161 g/mol to 4 000 000 g/mol, preferably in the range from 5000 g/mol to 3 000 000 g/mol, or from 150 000 g/mol to 2 000 000 g/mol.

In particular, at least one polyelectrolyte and/or at least one constituent of a polyelectrolyte may have been chemically modified, with attachment groups, for example, from a reaction, for example, of a polyelectrolyte and/or the precursor of a polyelectrolyte with an adhesion promoter and/or with adhesion-promoting groups, through uptake of chemical groups and/or through polymerization incorporation and/or copolymerization, for example.

Polyelectrolytes with attachment groups have proven particularly appropriate, in particular, as polyelectrolyte modifications.

As attachment groups which impart adhesion in the case of an anionic or cationic polyelectrolyte, it is possible to use chemical groups selected from the group consisting of chemical groups of polyfunctional epoxides, isocyanates, primary amines, secondary amines, tertiary amines, quaternary amines, amides, imides, imidazoles, formamides, Michael reaction products, carbodiimides, carbenes, cyclic carbenes, cyclocarbonates, polyfunctional carboxylic acids, amino acids, nucleic acids, methacrylamides, polyacrylic acids, polyacrylic acid derivatives, polyvinyl alcohols, polyphenols, polyols having at least one alkyl and/or aryl radical, caprolactam, phosphoric acids, phosphoric esters, epoxide esters, sulfonic aids, sulfonic esters, vinylsulfonic acids, vinylphosphonic acids, catechol, silanes and also the silanols and/or siloxanes formed therefrom, such as those, for example, based on alkoxy silanes, amino silanes, epoxy silanes, and vinyl silanes, triazines, thiazoles, thiazines, dithiazines, acetals, hemiacetals, quinones, saturated fatty acids, unsaturated fatty acids, alkyds, esters, polyesters, ethers, glycols, cyclic ethers, crown ethers, anhydrides, polysaccharides selected from pectins, alginates, glycogens, amyloses, amylopectins, calloses, celluloses, and hemicelluloses, and also of acetylacetones and of beta-diketo groups, carbonyl groups, and hydroxyl groups. In this context it should be borne in mind that although the functional groups (e.g. alcohols) are identical among different attachment groups from those specified, the tertiary structure means that differences in adhesion may occur.

In principle it is possible for the attachment groups to be bonded or to have been bonded covalently, via addition and/or substitution reactions, with customary reactions that are known to the skilled person, such as, for example, via in each case at least one esterification reaction, a coupling, a double bond and/or an alcohol, to a polyelectrolyte. Particularly suitable silanes, including the corresponding silanols and/or siloxanes that are formed therefrom (=silanes/silanols/siloxanes), are alkoxy silanes having at least one epoxy group, having at least one isocyanato group and/or having at least one double bond with radical effect. To form an activating coat it is preferred to use at least one modified polyelectrolyte which has been modified with a silane/silanol/siloxane having a degree of condensation in the range from 1 to 30 or from 1 to 20 monomer units per molecule. Generally speaking, these silicon compounds here may be or may have been coupled onto the chain, the backbone and/or the dendrimer of the polyelectrolyte via in each case at least one amino group, carboxyl group, hydroxyl group, isocyanato group, epoxy group and/or via at least one double bond, for example.

Having been found especially appropriate as derivatives of polyelectrolytes are polyelectrolytes with silane/silanol/siloxane, polysiloxane, carboxylate, hydroxyl, phosphate, phosphonate, sulfonate, urea, urethane and/or aromatic groups, and also the oligomers, polymers and copolymers thereof with medium-length and/or long-chain (=having more than 4 C atoms) hydrophobic polymers modified polyelectrolytes such as, for example, polyethyleneimines modified in such a way. The derivatives as well may diversely be copolymers such as, for example, in particular by addition during the polymerization of coupling groups known to the skilled person, especially aziridines, with—especially—polyfunctional epoxides, alcohols, amides, esters, isocyanates, imines, carboxylic acids, thiols, acrylates, methacrylates, vinyls, and substances having reactive double bonds and/or triple bonds.

Surprisingly it has been found that individual polyelectrolytes, in the case of certain combinations of an aqueous cationic or anionic composition to form a secondary coat, may be both cationic and anionic in the character of their effect, depending on the stabilization of the aforementioned aqueous composition. In other words, with the same salts, it is possible in principle for the cationic moiety in one instance and the anionic moiety in one instance to exert an effect on the secondary coating.

If the aqueous composition to form the secondary coat is cationically stabilized, the anionic moiety of the salt brings about, for example, the precipitation. If the aqueous composition to form the secondary coat is anionically stabilized, the cationic moiety of the salt brings about, for example, the precipitation.

In this case it is the nature of the stabilization that decides whether, for example, the precipitating effect of the salt is anionic or cationic and whether anionic or cationic salts are present. The reason is that in this case, emulsifiers that are likewise present decide on the anionic or cationic effect, and/or ionic groups that are likewise present, such as carboxylates, for example, decide on the anionic effect, or, for example, quaternary ammonium compounds decide on the cationic effect. The emulsifiers are part or even a major constituent in the stabilization of the particles and/or of the dispersions, which may either be anionic or cationic. Ionic stabilization comes either from ionic groups which are incorporated directly into the polymer, and/or from ionic emulsifiers. The emulsifiers have a hydrophilic moiety that has either a cationic nature or an anionic nature and therefore determines whether the particles they stabilize and/or the dispersion they stabilize has an anionic or cationic character.

Salts which can be used with preference are as follows: borides, borates, carbides, carbonates, hydrogen carbonates, chromates, dichromates, halides such as, for example, fluorides, chlorides, bromides, bromates and/or iodides, iodates, chlorates, hydroxides, permanganates, molybdates, niobates, oxides, hydroxides, nitrides, nitrates, nitrites, phosphides, phosphates such as, for example, aminoethyl dihydrogen phosphates, orthophosphates, hydrogen phosphates, dihydrogen phosphates, glycerol phosphates, and hexahalo phosphates, phosphonates, silicides, silicates, sulfites, hydrogen sulfites, sulfates, hydrogen sulfates, thiosulfates, sulfides, hydrogen sulfides, dithionates, peroxodisulfates, tantalates, titanates, tungstates, zincates, zirconates, azides, aluminates, ferrates, stannates and/or derivatives thereof, persalts, salts having two or more anionic constituents or having two or more cationic constituents, amides, salts with at least one alkyl group, saturated fatty acid salts having a linear alkyl chain with 3 to 29 C atoms in the chain, monounsaturated fatty acid salts having a linear alkyl chain with 10 to 23 C atoms in the chain, polyunsaturated fatty acid salts having a linear alkyl chain with 17 to 21 C atoms in the chain, saturated fatty acid salts with a branched alkyl chain having 3 to 19 C atoms in the chain, and/or derivatives thereof, and also, in particular, acetates, acetonates, acetylacetonates, benzoates, butyrates, isobutyrates, carbamates, caproates, cinnamates, citrates, cyanides, cyanates, thiocyanates, formates, fumarates, glutarates, lactates, malates, malonates, alkyl malonates, oxalates, propionates, pyruvates, gluconates, laurates, linoleates, maleates, myristates, oleates, palmitates, picrates, saccharates, salicylates, stearates, succinates, tartrates, thionates, valerates and/or derivatives thereof.

Particularly preferred anionic or cationic salts are acetates, amides, cyanates, thiocyanates, cyanides, butyrates, cinnamates, citrates, formates, fumarates, glutarates, isobutyrates, lactates, malates, malonates, oxalates, propionates, and/or pyruvates of polyvalent cations. Especially preferred are acetates and formates of polyvalent cations such as, for example, calcium acetate, calcium formate, aluminum acetate, and aluminum formate.

Preferred salts that are commonly both anionic and cationic are those listed below, with the nature of the stabilization determining their anionic or cationic effect:

aluminum acetate, aluminum acetylacetonate, aluminum benzoates, aluminum boride, aluminum diethylmalonate, aluminum fluoride, aluminum fluorosilicates, aluminum hydroxide, aluminum oxalate, aluminum oxide, aluminum phosphate, aluminum salicylate, aluminum silicate, aluminum sulfate, aluminum ammonium sulfate hydrate, aluminum pentaborate, aluminum peroxyborate, aluminum tetraborate, ammonium sulfate, ammonium borate, ammonium calcium phosphate, ammonium carbamate, ammonium hydrogen carbonate, ammonium chloride, ammonium chlorostannate, ammonium chromate, ammonium peroxychromate, ammonium bromium sulfate, ammonium copper chloride, ammonium fluoroborate, ammonium fluorosilicate, ammonium iodate, ammonium iron sulfate, ammonium magnesium chloride, ammonium magnesium phosphate, ammonium magnesium sulfate, ammonium permanganate, ammonium manganese phosphate, ammonium molybdate, ammonium myristate, ammonium oxalate, ammonium oxaloferrate, ammonium palmitate, ammonium periodate, ammonium phosphate, ammonium phosphomolybdate, ammonium phosphotungstate, ammonium picrate, ammonium rare earth sulfate, ammonium saccharate, ammonium sulfite, ammonium tartrate, ammonium thionate, ammonium vanadate, calcium acetate, calcium hydrate, calcium aluminate, calcium benzoates, calcium metaborate, calcium boride, calcium carbonate, calcium chloride aluminate, calcium chloride fluoride phosphate, calcium chromate, calcium chromide, calcium cinnamate, calcium citrate, calcium ferrite, calcium fluorosilicate, calcium fluoride, calcium formate, calcium fumarate, calcium gluconate, calcium glycerophosphate, calcium hydroxide, calcium iodate, calcium isobutyrate, calcium lactate, calcium laurate, calcium linoleate, calcium magnesium carbonate, calcium magnesium silicate, calcium malate, calcium maleate, calcium malonate, calcium butyrate, calcium molybdate, calcium oleate, calcium oxalate, calcium oxide, calcium palmitate, calcium phenoxide, calcium phosphate, calcium phosphite, calcium quinate, calcium silicate, calcium salicylate, calcium silicide, calcium stearate, calcium succinate, calcium sulfate, calcium tartrate, calcium thionate, calcium tungstate, calcium valerate, iron acetylacetonate, iron boride, iron carbide, iron carbonate, iron carbonyl, iron chromide, iron citrate, iron fluoride, iron iodate, iron lactate, iron nitride, iron nitrosocarbonyl, iron oxalate, iron oleate, iron oxide, iron phosphate, iron phosphide, iron phosphite, iron silicate, iron silicide, iron sulfate, iron sulfide, iron tartrate, magnesium antimonide, magnesium benzoate, magnesium borate, magnesium bromate, magnesium carbonate, magnesium chromide, magnesium citrate, magnesium fluoride, magnesium formate, magnesium hydroxide, magnesium iodate, magnesium lactate, magnesium laurate, magnesium molybdate, magnesium myristate, magnesium oleate, magnesium oxalate, magnesium oxide, magnesium palmitate, magnesium phosphate, magnesium silicate, magnesium silicide, magnesium stearate, magnesium sulfate, magnesium sulfide, magnesium tartrate, manganese benzoate, manganese carbonate, manganese chromide, manganese citrate, manganese fluoride, manganese glycerophosphate, manganese hydroxide, manganese lactate, manganese oxalate, manganese oxide, manganese phosphate, manganese silicate, manganese silicide, manganese sulfide, manganese tartrate, molybdenum bromide, molybdenum carbide, molybdenum carbonyl, molybdenum chloride, molybdenum hydrotetrachlorohydroxide, molybdenum hydroxide, molybdenum iodide, molybdenum oxide, molybdenum phosphate, molybdenum sulfide, titanium carbide, titanium nitride, titanium oxide, titanium phosphide, titanium sulfate, titanium sulfide, tungsten boride, tungsten bromide, tungsten carbide, tungsten carbonyl, tungsten iodide, tungsten oxide, tungsten phosphide, tungsten silicide, tungsten sulfide, zinc acetate, zinc aluminate, zinc benzoate, zinc butyrate, zinc caproate, zinc carbonate, zinc chromate, zinc citrate, zinc fluoride, zinc formate, zinc hydroxide, zinc iodate, zinc lactate, zinc laurate, zinc permanganate, zinc oleate, zinc oxalate, zinc oxide, zinc phosphate, zinc salicylate, zinc silicate, zinc sulfide, zinc tartrate, zinc tellurate, zinc valerate, zirconium bromide, zirconium carbide, zirconium carbonate, zirconium fluoride, zirconium nitride, zirconium oxide, zirconium phosphide, zirconium silicate and/or derivatives thereof.

For anionic and for cationic salts it is the case that preferably in step III. the activating coat is formed with at least one activating substance selected from the group consisting of melamine salts, nitroso salts, oxonium salts, ammonium salts, salts with quaternary nitrogen cations, salts of ammonium derivatives, and metal salts which in the case of cationic salts have at least one polyvalent element as cationic component and which in the case of anionic salts have at least one monovalent element as cationic component. With particular preference here the activating coat is formed of at least one activating substance selected in the case of cationic salts from the group consisting of metal salts of Al, B, Ca, Fe, Mg, Mn, Mo, Ti, W, Mn, Zn, and Zr, and selected in the case of preferably anionic salts from the group consisting of metal salts of Li, Na, and K.

The activating agents comprising anionic or cationic polyelectrolyte and/or anionic or cationic salt may adopt very different pH values, preferably those in the range from 3 to 12, more particularly pH values in the range from 4 to 11 or 6 to 10. The employable pH value of the activating substances is in some cases very substance-specific and is known in principle.

The aqueous composition (=activating agent) to form the activating coat preferably has a pH in the range from 2 to 12, from 3 to 11, or from 3.5 to 10, it often being advantageous not to carry out partial pickling and partial dissolution of the substrate surface, or not to do so to a substantial extent (low or high pH values pickle and produce activated metallic surfaces of good reactivity). Particularly if the activating agent comprises at least one anionic polyelectrolyte, its pH value is preferably in the range from 3 to 12 or 5 to 10, more preferably 6 to 9. Particularly if it comprises at least one cationic polyelectrolyte, its pH value is preferably in the range from 3 to 9 or 4 to 8, more preferably 5 to 7. Particularly if it comprises at least one anionic salt or at least one cationic salt, its pH is preferably in the range from 3 to 8 or 5 to 12, more preferably in the range from 4 to 11 or 5 to 10. The composition with which an activating agent is applied preferably has a pH value in the range from 4 to 7.

For the selection of the pH value and of the concentration of the composition of the activating agent, it is preferred for it to be a stable solution, a stable dispersion and/or for the polyelectrolyte still to be in the form of polycations, and not only in the form of uncharged molecules, at the pH value selected and at its concentration.

Furthermore, as and when required, the activating agents, as well as water and activating substances, may comprise further substances such as, for example, alcohols and/or thickeners such as, for example, cellulose, polysaccharides, welan gum, xanthan gum and/or polysiloxanes, preferably in a total amount in the range from 0.05 to 10 g/L or from 0.3 to 6 g/L. Furthermore, the activating agent and/or the activating coat may also comprise other substances such as, for example, fillers, mixtures such as compounded mixtures, and auxiliaries such as, for example, coat-forming substances such as phyllosilicates, agents for modifying the pH value, adhesion promoters such as, for example, silanes, wetting agents such as, for example, surfactants, stabilizers, thixotropic agents, thickeners, wetting agents, defoamers, preservatives, biocides and/or agents for adapting the pH to lower and/or higher values. The activating agent and/or the activating coat may preferably further comprise, in some embodiments, in each case at least one organic polymer, at least one amine, at least one kind of organic and/or inorganic particles and/or at least one dye.

The substances of the activating agent and/or of the activating coat, especially the polyelectrolytes, are preferably largely water-soluble or completely water-soluble. Or at least some of the various substances in the activating agent and/or the activating coat are water-soluble. In that case it may be difficult to produce a rinse-resistant activating coat. Particularly the water-solubility, but also the hygroscopic behavior and/or corrosion-promoting behavior of electrically conductive aqueous electrolyte solutions have contributed to a situation in which, in the industrial corrosion control sector, polyelectrolytes are rarely used as major constituents of an anticorrosion coating.

The activating agent preferably includes an amount of at least one activating substance such as polyelectrolyte and/or salt in the range from 90% to 100% by weight or from 95% to 99% by weight of the solids and active ingredients.

The amount of at least one activating substance in the first aqueous composition (=activating agent) is frequently in the range from 0.01 to 500 g/L. This amount is preferably in the range from 1 to 400 g/L, from 3 to 300 g/L, from 5 to 240 g/L, from 8 to 180 g/L, from 12 to 150 g/L, from 18 to 120 g/L, from 24 to 96 g/L, or from 30 to 70 g/L. In certain embodiments this amount is in the range from 0.5 to 200 g/L, from 0.8 to 150 g/L, from 1.2 to 120 g/L, from 2 to 90 g/L, from 4 to 80 g/L, from 5 to 70 g/L, from 6 to 60 g/L, from 8 to 50 g/L, from 10 to 40 g/L, or from 20 to 30 g/L. The amount of at least one activating substance and of the other solids and active ingredients present in the first aqueous composition is frequently in the range from 0.01 to 500 g/L. Preferably this amount is in the range from 1 to 420 g/L, from 3 to 320 g/L, from 5 to 260 g/L, from 8 to 210 g/L, from 12 to 170 g/L, from 18 to 140 g/L, from 24 to 110 g/L, from 30 to 90 g/L, or from 40 to 65 g/L. The activating agent preferably includes an amount of polyelectrolytes and/or of ionic salts in the range from 90% to 100% by weight or from 95% to 99% by weight of the solids and active ingredients.

The activating agent preferably contains at least one anionic or cationic polyelectrolyte in the range from 0.02 to 400 g/L, from 1 to 250 g/L, from 10 to 180 g/L, from 30 to 140 g/L, or from 50 to 110 g/L, but in certain embodiments in the range from 0.5 to 60 g/L, from 2 to 40 g/L, or from 6 to 25 g/L.

The activating agent preferably includes an amount of at least one anionic or cationic salt in the range from 5 to 500 g/L, more preferably in the range from 10 to 360 g/L, from 25 to 280 g/L, from 40 to 230 g/L, from 60 to 180 g/L, or from 85 to 140 g/L, but in certain embodiments an amount in the range from 15 to 130 g/L, from 30 to 100 g/L, or from 45 to 65 g/L.

With regard to the salts it is important to ensure a sufficiently high amount in order to allow the formation of an activating coat and not merely of an inefficient, excessively thin coat or virtually no coat. The reason is that in the aqueous solution the salts must frequently attain their saturation concentration in order to form an activating coat.

If the total amount of activating substances in the activating agent is lower than 0.01 g/L, the activating coat deposited is typically too insubstantial. If the total amount of substances or of activating substances in the activating agent is greater than 500 g/L, the solution typically becomes too viscous to allow homogeneous coating of the workpiece.

Overall, when applying the activation, in certain embodiments for OEM manufacture, it should be ensured that not only the pH value of the bath solution of the activating agent, but also the amount of solids and active ingredients of the activating substances, is kept constant within narrow ranges in the method of the invention, such as ±0.5 points in terms of pH value and/or ±20% or ±10% in terms of amount of solids and active ingredients. If the above-described limits are observed when applying the activation, it is possible for particularly uniform and reproducible coat formation to take place. Moreover, it is preferred to ensure that fractions of cleaner solution are not entrained into the activating tank.

Coating with an activating coat may take place preferably at temperatures between 5 and 95° C., more preferably at room temperature, or at temperatures between 15 and 50° C. In this case, in a number of embodiments, the substrate may have a temperature in the range from 10 to 180° C. and more particularly in the range from 40 to 120° C. or from 60 to 90° C.

The activating coat may be applied for example by rolling, flow coating, knife coating, injecting, spraying, brushing and/or dipping, including, for example, dipping at elevated temperature of the aqueous composition and/or of the substrate, and optionally by subsequent squeeze-off with a roller, for example. For this contacting and coating as well, particular preference is given to application by a dipping process.

For certain industrial procedures and systems it is particularly advantageous if at least one rinse-resistant activating coat is formed on the substrate. The rinse-resistant activating coat may also be formed of at least two activating coats applied in succession, optionally with intermediate drying after the application of the first activating coat, and these activating coats and their activating agents optionally have different chemical compositions.

On rinsing of the substrates coated with activating agent, the activating coat often is to be removed very little, and must not be removed completely. It is therefore advantageous if the activating coat is sufficiently rinse-resistant for the systems and procedures used. When the activating coat is being rinsed, it is necessary for it not to fully dissolve and/or become detached in the course of rinsing. It is therefore desired for the activating coat to be sufficiently rinse-resistant to still have a residual coat thickness after rinsing (=remaining activating coat).

In this context it is particularly preferred to apply an extremely rinse-resistant activating coat. The rinse resistance is favorably influenced for example by the intermediate drying step after activation, by the chemical modification of the polyelectrolytes, by the selection of polyvalent salts/ions/compounds, and/or by the selection of salts of low solubility. Alternatively the rinse resistance of the activating coat can also be significantly increased by carrying out intermediate drying of the activating coat prior to rinsing. This intermediate drying may be a slight partial drying or a substantial or complete drying.

Alternatively it may be advisable for the activating coat prior to rinsing to be heated, to undergo at least partial chemical modification, by salt replacement, such as, for example, by formation of and/or fixing of a salt of lower water-solubility, particularly on the surface of the activating coat. Furthermore, for rinsing, the activating coat may have a different temperature and/or a different pH value from the rinsing liquid. Every variant and every arbitrary combination of all of these measures may help to reduce or even to avoid the depletion of the activating agent, which in particular has good water-solubility, from the activating coat.

One way of improving the rinse resistance of the activating coat may take place with adhesion promoters and/or with adhesion-promoting chemical groups. A second possibility is the use of an electric auxiliary voltage when applying an activating coat, of less than 100 V or of less than 60 V or of less than 30 V or than 5 V, for example, with any electrical voltage that may be used being employed only as an initial auxiliary voltage, but initiating precipitation. It is particularly preferred in this context to apply an auxiliary voltage of less than 2.5 V, of less than 1 or of less than 0.5 V, more particularly in the form of direct voltage, with preferably virtually no current flowing. In the case of a current flow, the current strength is less than 0.1 $A/dm^2$ or, preferably, less than 0.01 $A/dm^2$. In this case the auxiliary voltage may initiate, for example, the migration of ions, but not precipitation, deposition and/or salting out. This auxiliary voltage may accelerate and/or improve the formation of the coat. In the majority of embodiments, however, no electrical voltage is applied from outside. If a dip coating is to be applied, it is possible to operate electrolessly or, optionally, only with an electrical auxiliary voltage, but the electrical auxiliary voltage, in contrast to the situation with an electrocoat material, is not used for precipitating, depositing or salting-out an aqueous composition. An electrical auxiliary voltage apparently has the effect of particle migration and hence of an increase in concentration on the part, for example, of the substance to be precipitated and/or on the part of the particles to be coagulated, but it does not bring about any separation of water from substances present therein, owing to the electrical field and current, as in the case of an electrocoating operation.

Furthermore, a rinsing liquid may also comprise a fixing aid for fixing and/or modifying the activating agent, by means of a salt exchange, for example.

Since often in the case of a rinsing operation a part of the fresh coating is rinsed away, it is advantageous to verify the remaining amounts of the activating coat, in terms of chemical elements, for example, by means of X-ray fluorescence analysis (XFA), especially before applying a secondary coating. Here, the lower detection limit for the elements silicon, titanium, zirconium, or manganese, in the order of magnitude of 1 mg/m$^2$, indicates the lower limit. When using standardized process conditions as in the examples, therefore, the rinse resistance of the activating coat may also be evaluated from the measurement values from XFA.

In one preferred method of the invention, it is possible in step III. for the activating coat to be formed with at least one activating substance selected from cationic polyelectrolytes from the group consisting of polyphenols, polyallylamines, including the polydiallylamines and polytriallylamines, polyethyleneimines, including the polydiethyleneimines and polytriethyleneimines, polyvinylamines, including the polydivinylamines and polytrivinylamines, polyvinylpyridines, chitosans, derivatives thereof, modifications thereof with at least one attachment group and/or with at least one silanel-silanol/siloxane, copolymers thereof, and mixtures thereof.

Examples of specific compounds include the following: polydiallyldimethyl-ammonium chloride, polyvinylammonium chloride, polyethyleneimineammonium chloride. Polyelectrolytes modified with attachment groups may in particular be considered to be derivatives of these polyelectrolytes.

In one preferred method of the invention, the activating coat may be formed with an activating agent comprising an aqueous composition which comprises at least one permanently cationic and/or latently cationic organic polymer and/or copolymer which is in solution in water and which has a chain, a backbone and/or a dendrimer based on polyethyleneimine, polyvinylamine and/or chitosan, and/or derivatives thereof and/or modifications thereof, forming an activating coat which comprises at least one permanently cationic and/or latently cationic polymer and/or copolymer.

In one preferred method of the invention, the activating coat may be formed of an activating agent comprising polymers, copolymers of at least two polymers and/or copolymers selected from those of polyethyleneimines, polyvinylamines, chitosans, and of derivatives of these polymers and copolymers thereof, and mixtures thereof.

In one preferred method of the invention, the activating coat may be formed of an activating agent comprising polyethyleneimine, polyethyleneimine modified with silane/silanol/siloxane, polyvinylamine, polyvinylamine modified with silane/silanol/siloxane, chitosan, chitosan modified with silane/silanol/siloxane, and mixtures and/or copolymers thereof.

Particularly preferred activating substances in a cationic activating agent are polyethyleneimines, polyvinylamines, polyallylamines, chitosans and derivatives thereof, melamine salts, nitroso salts, oxonium salts, ammonium salts, salts with quaternary nitrogen cations, salts of ammonium derivatives, and also metal salts which as a cationic component have a polyvalent element and preferably an element selected from the group of Al, B, Ca, Fe, Mg, Mn, Mo, Ti, W, Zn, and Zr.

Particularly preferred here are cations and salts having relatively high, or very high, oxidation states, more particularly $M^{2+}$, $M^{3+}$, $M^{4+}$, $M^{5+}$ and/or $M^{8+}$, where M denotes the cationic fractions, since they bring about a greater precipitation and/or coagulation effect as the valence increases. Such precipitation reactions are also known to the skilled person from the wastewater treatment sector, for the precipitation of organic fractions from dispersions. It should, however, be ensured that the amount of substances in the aqueous composition to form the secondary coat, i.e., more particularly, the amount of substances which can be precipitated, salted out and/or deposited, is not kept very low, in order to allow precipitation, coagulation, salting out and/or deposition to be accomplished. The lower limit on amount for precipitation, coagulation, salting out and/or deposition is dependent, however, on the substance.

The cationic salts include, for example, melamine salts, nitroso salts, oxonium salts, ammonium salts, salts with quaternary nitrogen cations, salts of ammonium derivatives, and also metal salts which as a cationic component have at least one polyvalent element and preferably at least one element selected from the group of Al, B, Ca, Fe, Mg, Mn, Mo, Ti, W, Zn, and Zr, the anionic counterions of the cationic salts being preferably boride, borate, carbide, carbonate, hydrogencarbonate, chromate, dichromate, halide such as, for example, fluoride, chloride, bromide, bromate and/or iodide, iodate, chlorate, hydroxide, permanganate, molybdate, niobate, oxide, hydroxide, nitride, nitrate, nitrite, phosphide, phosphate—such as, for example, aminoethyl-dihydrogen phosphate, orthophosphate, hydrogen phosphate, dihydrogen phosphate, glycerophosphates, and hexahalophosphate, phosphonate, silicide, silicate, hydrogen sulfite, sulfite, hydrogen sulfate, sulfate, thiosulfate, sulfide, hydrogen sulfide, dithionate, peroxodisulfate, tantalate, titanate, tungstate, zincate, zirconate, azide, aluminate, ferrate and/or stannate groups and/or organic anions.

Other preferred anionic salts are monovalent metal salts and ammonium salts, more particular organic salts, very preferably acetates and formates of ammonium, lithium, potassium and/or sodium.

Particularly preferred activating substances in an anionic activating agent are organic polymer and/or copolymer which a chain, backbone and/or a dendrimer based on polysaccharides such as, in particular, based on alginates and/or pectins, based on polyacrylic acids, polycarboxylic acids, polyvinylphosphonic acids and/or based on polymers that have been modified, copolymers that have been modified and/or derivatives thereof, the modification being with organic acid radicals such as, in particular, carboxylic acid groups, phosphoric acid groups and/or phosphonic acid groups, and, on the other hand, salts of ammonium, Li, Na and/or K, more particularly based on carbonates, acetates, benzoates, cyanates, butyrates, cinnamates, citrates, formates, fumarates, glutarates, isobutyrates, lactates, malates, malonates, oxalates, propionates and/or tartrates.

Polyphosphoric acids as well are potent precipitating agents.

Anionic salts used may be, in particular, inorganic or organic salts of ammonium, Li, Na and/or K. The anions and anionic salts include, for example, borides, borates, carbides, carbonates, hydrogen carbonates, chromates, dichromates, halides such as, for example, fluorides, chlorides, bromides and/or iodides, hydroxides, permanganates, molybdates, niobates, oxides, hydroxides, nitrides, nitrates, nitrites, phosphides, phosphates such as, for example, orthophosphates, hydrogen phosphates, dihydrogen phosphates, aminoethyldihydrogen phosphates, and hexachlorophosphates, phosphonates, silicides, silicates, hydrogen sulfites, sulfites, hydrogen sulfates, sulfates, thiosulfates, sulfides, hydrogen sulfides, dithionates, peroxodisulfates, tantalates, titanates, tungstates, zincates, zirconates, acetates, amides, benzoates, butyrates, cinnamates, citrates, cyanides, cyanates, thiocyanates, formates, fumarates, glutarates, isobutyrates, lactates, malates, malonates, oxalates, propionates, pyruvates, tartrates, especially of ammonium, Li, Na and/or K. Particularly preferred here are anions of relatively high or very high oxidation states which produce greater precipitation and/or coagulation, especially $X^{2-}$, $X^{3-}$, $X^{4-}$, $X^{5-}$ and/or $X^{6-}$, where X denotes the anionic fractions.

In one preferred method of the invention it is possible in step III. for the activating coat with an activating agent selected from the anionic polyelectrolytes of the group specified below.

In one preferred method of the invention it is possible in step III. for the activating coat to be formed with a first aqueous composition in the form of a solution (=including a colloidal solution), emulsion and/or suspension which at least one permanently anionic and/or latently anionic organic polymer and/or copolymer, in solution in water, that has a chain, a backbone and/or a dendrimer based on acrylamide copolymers, alginates, pectins, polyacrylic acids, polyvinylsulfuric acids, polyvinylsulfonic acids, polycarboxylic acids, polyphosphoric acids, polysaccharides, polystyrenesulfonates, polyvinyiphosphonic acids, polyvinyldialkylpropionates, chemical modifications thereof, derivatives thereof and/or copolymers thereof and optionally also based on organic salts such as acetates, benzoates, cyanates, butyrates, cinnamates, citrates, formates, fumarates, glutarates, isobutyrates, lactates, malates, malonates, oxalates, propionates and/or tartrates and/or derivatives thereof, a first coat being formed that comprises at least one permanently anionic and/or latently anionic polymer and/or copolymer and also, optionally, at least one organic salt and/or derivative thereof. In the case of anionic polyelectrolytes as well it may be useful to perform intermediate drying prior to rinsing, especially if the cationic polyelectrolytes are not modified and if no other measures are taken to make the activating coat rinse-resistant.

Particularly preferred activating substances, as anionically activating substances in the activating agent, are organic polymer and/or copolymer which a chain and/or backbone and/or dendrimers based on polysaccharides such as, in particular, based on alginates and/or pectins, polyacrylic acids, polycarboxylic acids, polyvinylphosphonic acids having acid-functional groups such as, in particular, carboxylic acid groups, phosphoric acid groups and/or phosphonic acid groups, modified polymers, modified copolymers and/or derivatives thereof, carbonates, acetates, benzoates, cyanates, butyrates, cinnamates, citrates, formates, fumarates, glutarates, isobutyrates, lactates, malates, malonates, oxalates, propionates and/or tartrates of ammonium, Li, Na and/or K.

An intermediate drying of an activating coat, especially a freshly applied activating coat, prior to rinsing is an opportunity to make an activating coat more resistant to rinsing. This kind of immobilizing may lead to a situation in which, in the context of a standardized rinsing, less is dissolved and/or rinsed off than in the case of activating coats which have not undergone intermediate drying, and therefore a thicker remaining activating coat is available for the subsequent activation. Consequences here may arise from the compaction of the activating coat, the low or absent water content of the activating coat, the more significant formation of the interface on the activating coat, a crystallization, or greater crystallization, of the activating agent, and/or filming and/or crosslinking of the substances of the activating coat. In the case of salt-based activating coats in particular, intermediate drying is often necessary.

As an alternative or in addition to intermediate drying it is possible to use an activating agent which comprises at least one substance modified with attachment groups, such as a polyelectrolyte modified with attachment groups, and its activating coat formed therefrom is likewise dissolved and/or rinsed off to a lower extent, during rinsing, than an activating coat with unmodified substances.

Rinsing may serve to remove excess substances and/or impurities such as, for example, salts and/or activating agent which in spite of drying has not yet dried.

The rinsing liquid uses preferably water or a dilute aqueous solution, more preferably deionized water.

Since a liquid composition such as an activating agent, for example, or a composition to form a secondary coat may not run off completely after coating, in depressions in substrates of complex shape that are to be coated, such as bodies in automobile construction, for example, it is possible that without a subsequent rinsing step, with a water rinse, for example, there will be an accumulation of the activating agent and excessively thick coatings in these depressions, and there will be instances of splashing, all of which may lead to instances of nonuniformity and paint defects. It is therefore advantageous for the substrates coated with an activating agent and/or with a secondary coat to be rinsed after they have been coated. This rinsing is carried out using, in particular, water, deionized water or an aqueous rinsing solution. The aqueous rinsing solution may comprise, for example, a salt, an acid, a basic compound and/or an auxiliary such as a crosslinker, for example. In this way it is possible for the surface of the coat that is to be rinsed to be chemically influenced and/or modified.

A further possibility for improving the rinse resistance of the activating coat is to optimize the rinsing conditions of the type of rinsing, rinsing speed, rinsing amount, rinsing intensity, rinsing duration and/or flow.

In the case of the rinsing of a rinse-resistant activating coat it is desirable after rinsing for there still to be at least 5 nm=0.005 μm or at least 0.02 μm of the original or, where appropriate, the theoretically producible dry film thickness—since often there is no drying or the drying that there is not sufficient to produce a dry film—as measured under a scanning electron microscope. This residual coat thickness is typically sufficient for activation. The residual coat thickness of the activating coat that remains after rinsing is preferably from 0.02 to 5 μm or from 0.05 to 2.5 μm or from 0.1 to 1.5 μm or from 0.2 to 1 μm. Frequently around 5% to 95%, often 20% to 80% or 40% to 60% of the original dry film thickness is eroded during rinsing of the activating coat.

In some embodiments 80% to 100% of the original activating coat is retained during rinsing and after rinsing.

In the case of the method of the invention, rinsing of the activating coat and/or rinsing of the secondary coat may take place preferably with a running and/or in a flowing aqueous rinsing liquid by means, for example, of rinsing off, spray rinsing and/or dip rinsing. Rinsing may more particularly take the form of dip rinsing, preferably by dipping in a still or moving bath, or the form of spray rinsing, by spraying onto the surface that is to be rinsed, for example, and/or by the surface to be rinsed being rinsed off. With each rinsing, it is possible to carry out multiple rinsing as and when required—for example, at least once with deionized water.

The residual amounts of the activating coat which are obtained after at least one rinsing with water, more particular deionized water, make it clear that in spite of intense rinsing, sufficiently high amounts of the activating coat of the invention are retained. These amounts are sufficient to provide the activated surface with effective preparation for the subsequent treatment steps.

In accordance with the invention it has been found that if a very high fraction of the activating coat has been retained during rinsing, the deposition thickness and the deposition rate have been improved approximately in proportion to the thickness of the activating coat.

In the case of contact between the remaining activating coat and the aqueous composition to form the secondary coat, activation occurs. Activation via the activating coat provides the prerequisite here for precipitation, for salting out and/or for deposition of particles.

In the present specification, a dry film thickness for the secondary coat of more than 1, of more than 2 μm, of more than 4 μm, of more than 6 μm, of more than 8 μm, of more than 10 μm, or even of more than 12 μm is preferred.

For certain industrial processes and systems it is particularly advantageous if at least one rinse-resistant secondary coat is formed. The at least one secondary coat (=precipitation coat), which in many variant embodiments is preferably also rinse-resistant, may also be formed from the substances of at least one activating coat and at least one secondary coat. The secondary coat may also be formed from at least two individual secondary coats, possibly having different chemical compositions.

In principle the aqueous composition to form the secondary coat may be applied for example by rolling, flow coating, knife coating, injecting, spraying, brushing and/or dipping, including, for example, dipping of the aqueous composition at elevated temperature, and optionally by subsequent squeezing-off, with a roller, for example. Particularly preferred, for this contacting and coating as well, is application by a dipping process.

Preferably at least 90% by weight of the solids and active ingredients in the aqueous composition to form the secondary coat (=precipitation coat) comprises constituents which can be precipitated, deposited and/or salted out and which are anionically, zwitterionically, sterically and/or cationically stabilized, where anionically and cationically stabilized constituents do not adversely affect one another, more preferably to an extent of at least 92%, 94%, 96%, 98%, 99% or 100% by weight.

The aqueous composition to form the secondary coat (=precipitation coat) preferably comprises at least one substance which by virtue of being activated with the activating substances of the remaining activating coat can be precipitated, salted out and/or deposited.

With particular preference the aqueous composition to form the secondary coat comprises at least one dispersion and/or at least one formulation such as a paint formulation, for example. It is particularly preferred here in step VI. for the aqueous compositions to be formulations and/or dispersions to form an organic secondary coat, which are selected from the group consisting of the following aqueous compositions:

A) anionically stabilized polymer particle dispersions,
B) anionically stabilized formulations,
C) sterically stabilized polymer particle dispersions,
D) sterically stabilized formulations,
E) zwitterionically stabilized polymer particle dispersions,
F) zwitterionically stabilized formulations and mixtures thereof or from:
G) cationically stabilized polymer particle dispersions,
H) cationically stabilized formulations,
I) sterically stabilized polymer particle dispersions,
J) sterically stabilized formulations,
K) zwitterionically stabilized polymer particle dispersions,
L) zwitterionically stabilized formulations and mixtures thereof.

Especially preferred here are A), B) and mixtures thereof, and also G) and H) and mixtures thereof.

The aqueous composition to form an organic secondary coat more preferably comprises preferably organic polymers and/or copolymers based on polyvinyl alcohols, polyvinyl acetates, polybutyl acrylates and/or other polyacrylates, polyepoxide esters, polyacrylamides, polyacrylic acids, polycarbonates, polyesters, polyethers, polystyrene-butadienes, poly(meth)acrylic esters, polyvinyl acetate copolymers with acrylic esters and/or copolymers with dibutyl maleate and/or with vinyl esters of at least one Koch acid, polyethylenes, polyvinyl chlorides, polyacrylonitriles, polyepoxides, polyurethanes, polyacrylates, polymethacrylates, polyesters, polyamides, polytetrafluoroethylenes, polyisobutadienes, polyisoprenes, silicones, silicone rubbers and/or derivatives thereof. These polymers and/or copolymers are present in the aqueous composition at, in particular, at least 40% by weight of the solids and active ingredients.

With particular preference the aqueous composition to form the secondary coat (=precipitation coat) comprises a dispersion which at least one kind of stabilized polymer particles selected from the abovementioned organic polymers and/or copolymers and optionally also at least one corrosion-inhibiting inorganic pigment.

For precipitation, salting out and/or deposition to be able to occur, it is frequently necessary to have a minimum activating coat thickness on the substrate surface of at least 5 nm dry film thickness.

The aqueous composition to form the secondary coat, after contact with the activating coat, frequently comprises a low level of activating substances, which are often likewise incorporated into the secondary coat. In that case the precipitated substances may also comprise the substances that precipitate.

The aqueous composition to form a secondary coat preferably includes an amount of solids and active ingredients in the range from 1% to 60% by weight, from 2% to 50% by weight, from 3% to 40% by weight, from 5% to 30% by weight, from 6% to 24% by weight, from 7% to 20% by weight or from 8% to 16% by weight of the total aqueous composition. The amount of solids and active ingredients therein is preferably in the range from 10 to 600 g/L, from 18 to 480 g/L, from 24 to 360 g/L, from 28 to 320 g/L, from 32 to 280 g/L, from 36 to 240 g/L, from 40 to 200 g/L, from 44 to 160 g/L, from 48 to 120 g/L or from 52 to 80 g/L. In other embodiments the amount of solids and active ingredients therein is preferably in the range from 10 to 400 g/L, from 14 to 350 g/L, from 18 to 310 g/L, from 22 to 290 g/L, from 26 to 260 g/L, from 30 to 230 g/L, from 34 to 205 g/L, from 38 to 180 g/L, from 42 to 155 g/L, from 46 to 130 g/L, from 50 to 105 g/L or from 54 to 70 g/L.

The aqueous composition to form the secondary coat, and also the secondary coat formed therefrom, often comprise primarily polymers, copolymers and/or mixtures thereof. In certain embodiments, particularly in the case of formulations, they preferably comprise 90% to 100% by weight of the solids and active ingredients.

The secondary coat comprises the precipitated, salted-out and/or deposited substances optionally with a fraction of the activating substances, preferably in an amount in the range from 90% to 100% by weight or from 95% to 99% by weight.

There may be many substances among the substances of an aqueous composition to form a secondary coat, that can be precipitated, coagulated, salted out and/or deposited.

In this context, for example, in particular the stabilized fractions of the precipitable substances of the aqueous composition are precipitated, salted out and/or deposited from that aqueous composition, especially if the stabilization is eliminated (if destabilization is carried out). In that case it is advantageous if the activating substances of the activating coat within up to 15 minutes or even within up to 5 minutes precipitate, salt out and/or deposit the substances that are to be precipitated and, in so doing, form secondary coats which where possible have a dry film thickness, after drying, of more than 10 µm. In this context it is possible to salt out the stabilization of the particles and carry out optional incorporation into the secondary coat. It should be ensured that as far as possible no corrosive or corrosion-promoting constituents are incorporated into the secondary coat. It is advantageous for the secondary coat formed to be a very largely homogeneous and impervious coating.

Stabilized polymeric substances, in particular, are precipitated here. At the same time there is often destabilization of these substances. The precipitated products are frequently X-ray-amorphous.

The substances in an aqueous composition to form a secondary coat that can be salted out may include nonpolymeric ionic substances such as salts, for example. The salted-out products are frequently crystalline. In this context it is advantageous for the salt formed to have a low solubility in water. A calcium sulfate, for example, has proven particularly appropriate here.

The substances in an aqueous composition to form a secondary coat that can be deposited may include many substances such as, for example, all kinds of inorganic nanoparticles, inorganic colloids, and inorganic pigments, more preferably stabilized particles. For example, in particular, oxides such as those based on $SiO_2$ and silicates, more particularly phyllosilicates, are deposited from the aqueous composition to form a secondary coat. The deposited products may be crystalline and/or X-ray-amorphous and also water-insoluble.

The aqueous composition to form the secondary coat preferably includes an amount of precipitable stabilized polymeric substances of in the range from 60% to 100% by weight of the solids and active ingredients, preferably in the range from 70% to 99% or from 80% to 95% or from 88% to 92% by weight of the solids and active ingredients. The aqueous composition to form the secondary coat preferably includes an amount of precipitable stabilized polymeric substances in the range from 1 to 400 g/L or more preferably from 5 to 300 g/L, from 10 to 240 g/L, from 20 to 210 g/L, from 30 to 180 g/L, from 40 to 150 g/L, from 50 to 120 g/L, or from 60 to 90 g/L.

The aqueous composition to form the secondary coat preferably includes an amount of substances which can be salted out in the range from 1 to 200 g/L or more preferably from 5 to 160 g/L, from 10 to 120 g/L, from 20 to 90 g/L, or from 30 to 60 g/L.

The aqueous composition to form the secondary coat preferably includes an amount of depositable substances in the range from 0.1% to 50% by weight, more preferably in the range from 1% to 40% or from 3% to 30% or from 5% to 25% or from 8% to 21% or from 10% to 18% by weight of the depositable substances. The aqueous composition to form the secondary coat preferably includes an amount of depositable substances in the range from 1 to 200 g/L or with particular preference from 5 to 160 g/L, from 10 to 120 g/L, from 20 to 90 g/L, or from 30 to 60 g/L.

It is preferred to use an aqueous composition with a combination of different kinds of activating substances, such as, for example, of at least one polyelectrolyte, in particular as matrix substance(s), with at least one polyvalent salt.

Subsequently a secondary coat is applied to the at least one activating coat. The compositions that are used for producing a secondary coat consist of or comprise preferably at least one aqueous dispersion, more particularly at least one stable dispersion, and/or at least one aqueous formulation, more particularly at least one stable formulation, more preferably a paint formulation or a stable paint formulation. Besides water, this composition may optionally comprise constituents of an organic solvent such as at least one alcohol, at least one ether and/or an organic solvent with poor or no water-solubility, such as a furan, at least one kind of organic and/or inorganic particles, at least one substance which influences the pH value, such as acid, for example, such as carboxylic acid and/or fatty acid, such as acetic acid and/or mineral acid, ammonia, amine, derivatives thereof, stabilized forms thereof and additives, including paint additives, such as, for example, an organic and/or inorganic crosslinker, a photoinitiator, an adhesion promoter such as one based on silane/siloxane, a dispersant, a lubricant such as wax, a film-forming assistant, a wetting agent such as one based on polysiloxanes, a protective colloid, an emulsifier, an organic and/or inorganic corrosion inhibitor, a defoamer, a preservative and/or a biocide.

Polymers and/or copolymers used in the aqueous composition to form the secondary coat and/or in the secondary coat formed therefrom, in the method of the invention, may be organic polymers and/or copolymers, based more particularly on alkyd resin, aminoplast resins, epoxide, ethylene-acrylate, alkyl(meth)acrylate, polyethylene, polyisobutylene, polyacrylonitrile, polyvinyl chloride, poly(meth)acrylate, polyalkyl(meth)acrylate such as, for example, polymethyl methacrylate, polyvinyl acetate, polyvinyl alcohol, polyvinylidene chloride, polytetrafluoroethylene, polyisoprene, polypropylene, poly(meth)acrylate, polyester, polyether, polyurethane, phenolic resin, polycarbonate, polyamide, polystyrene, polysulfide, siloxane with up to about 30 monomer units per molecule (=degree of condensation), polysiloxane, polyvinyl acetal, polyacetal, styrene acrylate, derivatives thereof, compounded forms thereof and/or mixtures thereof. The organic substances are frequently in particulate form, especially in dispersions. As and when necessary, a formulation may comprise at least one dispersion. In the case of dispersions and of certain formulations it is preferred for them to have an acid number in the range from 5 to 200, more particularly in the range from 8 to 60 or from 10 to 35. Aqueous compositions which are used more particularly as solutions of organic polymers and are optionally dried down and/or chemically modified may also have acid numbers in the range from 5 to 1000.

The aqueous composition to form a secondary coat preferably includes an amount of organic polymers and/or copolymers in the range from 40% to 100% by weight, from 46% to 98% by weight, from 52% to 95% by weight, from 58% to 92% by weight, from 64% to 88% by weight, from 68% to 82% by weight, or from 72% to 76% by weight of the solids and active ingredients in the aqueous composition. The amount of organic polymers and/or copolymers therein is preferably in the range from 10 to 600 g/L, from 18 to 480 g/L, from 24 to 360 g/L, from 28 to 320 g/L, from 32 to 280 g/L, from 36 to 240 g/L, from 40 to 200 g/L, from 44 to 160 g/L, from 48 to 120 g/L, or from 52 to 80 g/L. In other embodiments the amount of organic polymers and/or copolymers therein is preferably in the range from 10 to 400 g/L, from 14 to 350 g/L, from 18 to 310 g/L, from 22 to 290 g/L, from 26 to 260 g/L, from 30 to 230 g/L, from 34 to 205 g/L, from 38 to 180 g/L, from 42 to 155 g/L, from 46 to 130 g/L, from 50 to 105 g/L, or from 54 to 70 g/L.

The aqueous composition to form the secondary coat (=precipitation coat) very preferably comprises at least one organic stabilized binder, at least one corrosion-inhibiting pigment, and optionally at least one additive such as, in particular, a thickener, and also, optionally, a low amount of organic solvent. In certain embodiments the aqueous composition to form the secondary coat will comprise two or three organic stabilized binders, at least one color-imparting pigment, and at least one corrosion-inhibiting pigment. In individual embodiments it has been found appropriate to use organic polymer dispersions and/or formulations which include, more particularly, graphite and/or carbon black, in order to mimic the typical gray color of a cathodic deposition coating.

The organic polymers and/or copolymers in the aqueous composition to form a secondary coat are commonly in the form of stabilized dispersions or of stabilized formulations. They are customarily in particulate form. Stabilization may be accomplished sterically and/or electrostatically, and is usually brought about using at least one emulsifier. Since the stabilization when using commercial dispersions or commercial formulations is typically unknown, and neither the degree of stabilization nor the fractions of steric and electrostatic stabilization are known, and can hardly be measured, success in forming a secondary coating, in particular by precipitation and coagulation, cannot be predicted, and so the quality of the precipitation, coagulation, salting-out and/or deposition of the secondary coat cannot be predicted and cannot be derived, but instead can only be determined experimentally.

The stabilization of particles in an aqueous phase, such as a colloidal distribution of the particles dispersed in a continuous phase, for example, is accomplished stably provided the particles are held apart by forces of repulsion. Fundamental stabilization mechanisms that are active here are electrostatic stabilization and/or steric stabilization. For electrostatic stabilization, there must be charges present on the surface of the particles. Steric stabilization occurs when macromolecules are attached to the particle surface and when the shells of the particles are unable to move substantially into one another. Accordingly, the particles remain at a distance from one another such that, for example, a dispersion is stable.

Molecules referred to as zwitterionic are those which possess not only negatively charged but also positively charged functional groups. The zwitterionic surfactants, which can be used to stabilize particles in aqueous solutions, have a polar moiety and an apolar moiety. Neutral substances known include nonionic surfactants and all organic molecules which do not carry any groups with anionic character.

In this context it is preferred for substances to be selected in each case, and combined in the method of the invention, that have chemical affinity between activating agent and the substances for forming the secondary coat.

The aqueous composition to form a secondary coat and also the secondary coat formed therefrom frequently comprise predominantly polymers, copolymers and/or mixtures thereof. In some embodiments, especially in the case of formulations, they preferably comprise 0.1% to 45% by weight, based on the solids and active ingredients, of one or more inorganic substances, more particularly 1% to 30% or 6% to 15% by weight.

Inorganic substances which may be present depending on the procedure, profile of properties of the secondary coat, and intended application for the coated substrate, are preferably color pigments, white pigments such as those based on $TiO_2$, for example, amorphous dyes, fillers, inorganic fibers, and/or anticorrosion pigments with weak solubility in water, such as those based on silica(s), oxide(s) and/or silicate(s), for example, such as anticorrosion pigment(s) containing alkaline earth metals, such as calcium-modified silica and/or alkaline earth metal silicate.

The amount of organic solvents in the aqueous composition to form a secondary coat may be 0% or 0.01% to 5% or 0.1% to 1% by weight of the liquid composition, based on the liquid composition.

Particles which can be used in the context of the method of the invention are any of a wide variety of types of particle, particle sizes, and particle shapes.

As particles in the aqueous composition to form the secondary coat and/or in the secondary coat formed therefrom it is possible with preference to use oxides, hydroxides, carbonates, phosphates, phosphosilicates, silicates, sulfates, organic polymers including copolymers and derivatives thereof, waxes and/or compounded particles, especially those based on anticorrosion pigments, organic polymers, waxes and/or compounded particles, and/or mixtures thereof. They preferably have particle sizes in the range from 5 nm to 15 µm, from 8 nm to 5 µm, from 12 nm to 3 µm or from 15 nm to 1.5 µm, more particularly from 20 nm to 1 µm, from 30 nm to 700 nm, from 40 nm to 600 nm, or from 50 nm to 500 nm. They are preferably water-insoluble particles.

The water-insoluble particles include, among others, stabilized particles where the stabilization takes place in the aqueous phase and/or is present in the aqueous phase, and can be achieved preferably on the particle surface, for example with a nonionic and/or ionic emulsifier, with ions, with a flow control agent and/or with a thickener.

Compounded particles feature in one particle a mixture of at least two different substances. Compounded particles may often have other substances having very different properties. They may, for example, comprise in whole or in part the composition for a paint, perhaps even with the presence of substances of non-particulate form, such as, for example, surfactant, defoamer, dispersant, paint auxiliary, other kinds of additives, dye, corrosion inhibitor, weakly water-soluble anticorrosion pigment and/or other substances which are customary and/or known for such mixtures. Paint constituents of these kinds may be suitable and/or frequently utilized, for example, for organic coatings for forming, for anticorrosion primers and other primers, for paints, surfacers and/or clearcoat materials.

Generally in this context it is frequently preferred to use a) a mixture of chemically and/or physically different particles, b) particles, aggregates and/or agglomerates of chemically and/or physically different particles, and/or c) compounded particles, in the aqueous composition to form the secondary coat and/or in the secondary coat formed therefrom.

An anticorrosion primer frequently has electrically conductive particles and in the case of a high fraction of such particles can be electrically welded even at coat thicknesses in the range, for example, of 3 to 10 μm.

In many cases it is preferred for a particle-comprising aqueous composition and/or the secondary coat formed from it to comprise not only at least one kind of particles but also at least one nonparticulate substance, more particularly additives, dyes, corrosion inhibitors and/or weakly water-soluble anticorrosion pigments. As particles in an aqueous composition to form the secondary coat and/or in the secondary coat formed therefrom it is also possible, for example, for colored and/or electrically conductive particles, based in particular on oxide particles with electrically conducting coatings, iron phosphide, iron oxide, fullerenes and other carbon compounds with graphite-like structures and/or carbon black, optionally including nanocontainers and/or nanotubes, to be present. On the other hand it is possible here more particularly to make use, as particles in the composition and/or in the coating formed from it, of coated particles, chemically and/or physically modified particles, core-shell particles, compounded particles comprising substances of different kinds, encapsulated particles, nanocontainers and/or nanotraps.

In one embodiment of the method of the invention it is preferred for the particle-comprising aqueous composition to form a secondary coat, the secondary coat formed therefrom and/or the coating formed therefrom by means for example of filming and/or crosslinking to comprise not only at least one kind of particles but also in each case at least one dye, color pigment, anticorrosion pigment, corrosion inhibitor, conductivity pigment, other kind of particles, silane/silanol/siloxane, polysiloxane, silazane/polysilazane, paint additive and/or additive such as, for example, in each case at least one surfactant, one defoamer and/or one dispersant.

In the method of the invention it is preferred for the composition and/or the coating formed therefrom to have not only at least one kind of particles and optionally, besides at least one nonparticular substance, partly or completely, a chemical composition for a primer, a paint such as, for example, for a surfacer, topcoat and/or clearcoat material.

Particles which can be used in the aqueous composition to form a secondary coat in the method of the invention, especially when the intention is first to form a particle-rich secondary coat from the composition, are, in particular, particles based on alkyd resin, aminoplast resins, epoxide, ethylene-acrylate, alkyl(meth)acrylate, polyethylene, polyisobutylene, polyacrylonitrile, polyvinyl chloride, poly (meth)acrylate, polyalkyl(meth)acrylate such as, for example, polymethyl methacrylate, polyvinyl acetate, polyvinyl alcohol, polyvinylidene chloride, polytetrafluoroethylene, polyisoprene, polypropylene, poly(meth)acrylate, polyester, polyether, polyurethane, phenolic resin, polycarbonate, polyamide, polystyrene, polysulfide, siloxane with up to about 30 monomer units per molecule (=degree of condensation), polysiloxane, polyvinyl acetal, polyacetal, styrene acrylate, derivatives thereof, compounded forms thereof and/or mixtures thereof. In the case of particle-rich secondary coats as well, filming of the coating may be particularly advantageous. The reason is that all of the substances may be present in particular form.

As additions to the organic polymers and copolymers in the form of particles it is advisable in numerous embodiments to have pigments and/or additives of the kind frequently used in paints and/or primers.

The aqueous composition to form the secondary coat preferably has a dynamic viscosity in the range from 1 to 10 000 mPa s; more preferably it has a viscosity in the range from 4 to 5000 or from 8 to 1200 mPa s, very preferably in the range from 15 to 800, from 20 to 450, from 40 to 350, or from 60 to 250 mPa s, in each case as measured using a Physica MCR 300 Modular Compact Rheometer model rotary viscometer from Paar Physica in accordance with DIN EN ISO 3219.

The pH value of the aqueous composition to form a secondary coat may vary within wide limits and/or may be adapted to the appropriate pH values. The pH value is preferably in the range from 4 to 12, more preferably in the range from 6 to 11, from 7 to 10, or from 7.5 to 9.

One way to improve the deposition of a secondary coat and/or to improve the secondary coat is the chemical modification of the substances in the secondary coat using, for example, silane/silane/siloxane and/or other attachment groups.

Another way of improving the deposition of a secondary coat and/or for improving the secondary coat is to use a low electrical auxiliary voltage in the course of precipitation, salting-out and/or deposition for applying a secondary coat. In this case it is particularly preferred to apply an auxiliary voltage of less than 2.5 V, of less than 1 V, or of less than 0.5 V, more particularly as direct current, in which case there is preferably virtually no current flow. In the event of a current flow, the current strength is less than 0.1 A/dm$^2$ or preferably less than 0.01 A/dm$^2$. The auxiliary voltage here may have the effect, for example, of accelerating ion migration, but not of initiating precipitation, deposition and/or salting out. This auxiliary voltage may accelerate the formation of the coat and/or enhance the coat quality. In the majority of embodiments, however, no electrical voltage is applied from the outside. If a deposition coating is to be applied, it is possible to operate electrolessly or, optionally, with an electrical auxiliary voltage, but in contrast to the situation with an electrodeposition coating material, the electrical auxiliary voltage is not used primarily for precipitation, deposition and/or salting-out of an aqueous composition. The evident effect of the electrical auxiliary voltage is that of particle migration and hence of an increase in concentration of, for example, the substances to be precipitated and/or the particles to be coagulated, but it does not result in separation of water and solids present therein on the basis of the electrical field and current, as is the case with application of an electrodeposition coating material.

Coating with a secondary coat may take place preferably at composition temperatures between 5 and 95° C., more preferably at room temperature, or at temperatures between 15 and 50° C. In this case, in a number of embodiments, the substrate may have a temperature in the range from 10 to 120° C. and more particularly in the range from 25 to 95° C. or from 40 to 70° C.

Coating with the aqueous composition to form the secondary coat may take place by any mode of application, more particularly, for example, by spraying, dipping, rolling, etc.

In certain embodiments of the present invention this coating technique is a self-regulating technique, and so a coating is formed only for a certain time and in accordance, for example, with the coagulation potential of the activating coat irrespective of the duration of contact with the solution for the secondary coat.

Rinsing, especially of the secondary coat that is only slightly, partially dried, is as yet undried and/or is freshly applied, may be advantageous in order to reduce the amount of impurities and excessive fractions of substances which have not been precipitated, salted out and/or deposited (wet-on-wet method). It can help to remove residual amounts of corrosive substances.

It also helps to adapt a method of the invention in analogy to an existing dipping process.

If, however, the applied secondary coat is not rinsed prior to drying, this may result in an uneven coating, possibly with more poorly baking and/or more poorly crosslinking portions, in a coating with poorer adhesion of the secondary coat to a subsequent coating, and/or in a secondary coat having lower corrosion resistance.

In one embodiment of the method of the invention it is preferred for the secondary coat to be rinsed at least once with a rinsing liquid such as water and/or an aqueous afterrinse liquid, and thereafter to be coated, preferably in the wet, damp, partially dried or no more greatly dried state, with at least one organic composition, such as a primer and/or paint.

The secondary coat can be dried in a variety of ways, optionally after at least one rinse. Drying may take place in any conventional way and in all known dryers, but also with infrared radiation, with NIR radiation, with forced air, with fresh-air feed, etc. Particularly preferred is a drying operation with high gas and/or air throughput, in order to remove the high level of water vapor. Drying must be adapted appropriately to the physical composition and thickness of the secondary coat to be dried, and also to the nature of the coating line and its speed, in order that, as far as possible, there are no cracks, incipient cracks, delaminations, pops or other defects occurring.

The secondary coat is preferably filmed and/or crosslinked in order to form a very largely impervious coating that also, in the case of metallic substrate, it is corrosion-resistant. Drying may take place in particular in a temperature range from 10 to 170° C., preferably in a range from 15 to 140 or from 20 to 120 or from 25 to 90 or from 30 to 80° C., more preferably above 50 or 70° C. to 130 or to 95° C. Filming and/or crosslinking may take place in particular during drying and/or heating. Crosslinking may also take place wholly or partly by radical polymerization and/or additionally by an aftercrosslinking procedure—a thermal aftercrosslinking procedure, for example. The crosslinking processes are known in principle. At elevated temperature, filming will typically occur. A film-forming assistant may also help to ensure that in the course of drying, a solidifying surface layer is formed on the secondary coat, such a layer being a hindrance to further egress of water vapor.

The extent to which filming and/or crosslinking takes place is dependent on the chemical construction of the composition used and on the chemical construction of the secondary coat formed from that composition, and in principle is familiar to the skilled person, meaning that there is no need for a further description here.

By filming is meant the formation of a film from a material with a high organic fraction, such as a polymer dispersion, in the course of which, in particular, polymer particles undergo transition, preferably at room temperature or slightly elevated temperature, into a uniform film. Often in this context there is talk of coalescence of the comparatively large polymer particles. Filming in this context takes place from an aqueous medium, during drying, and optionally with plasticization of the polymer particles by means of the film-forming assistants that remain. Film formation can be improved and/or enabled by the use of soft synthetic resin (König Pendulum hardness at room temperature in accordance with DIN EN ISO 1522 measured at less than 30 s) and/or by addition of substances which act as temporary plasticizers (=film-forming assistants). Film-forming assistants act as specific solvents which soften the surface of the polymer particles and so allow them to be altered geometrically by coalescence of the organic particles with one another, but which in particular do not have short-term volatility and, in particular, undergo primarily evaporation, after the evaporation of the water, and preferably do not remain durably in the film. In this case the resultant film is often pore-free or substantially pore-free, and may include undissolved and/or insoluble particles such as inorganic particles, for example. It is advantageous here for these plasticizers on the one hand to remain in the aqueous composition for a sufficiently long time to be able to act on the polymer particles for a long time, and thereafter to evaporate and thus escape from the film. In the case of appropriate film formation, in many variant embodiments, a transparent film is formed, but not a milky white or even powdery film, which is a sign of disrupted film formation. For perfect or near-perfect film formation, the temperature of the wet film applied to a surface must lie above the minimum filming temperature (MFT). Only in that case are the polymer particles soft enough to coalesce. It is particularly advantageous here if the film-forming assistants as temporary plasticizers do not alter, or virtually do not alter, the pH value of the aqueous composition.

Film formation can be improved by the use of thermoplastic polymers and/or copolymers and/or by addition of substances which serve as temporary plasticizers. These last-mentioned film-forming assistants act as specific solvents, which soften the surface of the polymer particles of a dispersion or formulation and so allow it to coalesce. In this context it is advantageous if these plasticizers remain in the aqueous composition for a sufficiently long time on the one hand in order to act on the polymer particles for a long time, and thereafter evaporate and hence escape from the film. It is further advantageous if residual water is also present for a sufficiently long time during the drying procedure.

The at least one film-forming assistant, which is or has been added in the form of at least one long-chain alcohol, serves for improving film formation particularly in the course of drying. From the organic film former, together with at least one long-chain alcohol, in particular during and/or after the loss of water and other volatile constituents, a largely or entirely homogeneous organic film is formed by filming. For better film formation of the polymeric particles of the aqueous composition during drying, it is possible to use, particularly as a temporary plasticizer for the polymer particles, at least one long-chain alcohol, preferably a butanediol and derivatives thereof, based more particularly on triethylene glycol, tripropylene glycol and/or derivatives thereof.

The amount of at least one film-forming assistant in the aqueous composition—more particularly in the bath—may be preferably 0.01 to 50 g/L, based on solids including active ingredients, more preferably 0.08 to 35 g/L, very preferably 0.2 to 25 g/L, 0.3 to 20 g/L, or 0.5 to 16 g/L, more particularly 1 to 12 g/L, 2 to 10 g/L, 3 to 8 g/L, or 4 to 6 g/L.

The weight ratio of the amounts of organic film former to amounts of film-forming assistants in the aqueous composition—more particularly in the bath—may vary within wide ranges; more particularly, it may be ≤(100:0.1). This ratio is preferably in the range from 100:10 to 100:0.2, from 100:5 to 100:0.4, or from 100:2.5 to 100:0.6, more preferably in the range from 100:2 to 100:0.75, from 100:1.6 to 100:0.9 or from 100:1.4 to 100:1.

Often a mixture of at least two film-forming assistants is used. The film-forming assistants preferably have a boiling point at 760 mm Hg in the range from 140 to 400° C., more particularly in the range from 150 to 340° C., from 160 to 310° C. or from 170 to 280° C., and/or an evaporation index for ether =1 in the range from 100 to 5000, more particularly in the range from 120 to 4000, from 135 to 2800, or from 150 to 1600.

Especially advantageous as film-forming assistants are alcohols such as, for example, diols and also their ethers and esters having more particularly 4 to 20 or having 6 to 18 or having 8 to 16 C atoms, preferably alcohols, ethylene glycol ethers, and propylene glycol ethers having more particularly 4 to 20 or having 6 to 18 or having 8 to 16 C atoms.

Film-forming assistants which can be used in one preferred variant of the invention are selected from the group consisting of butanediol, butyl glycol, butyl diglycol, ethylene glycol ethers such as ethylene glycol monobutyl ether, ethylene glycol monoethyl ether, ethylene glycol monomethyl ether, ethyl glycol propyl ether, ethylene glycol hexyl ether, diethylene glycol methyl ether, diethylene glycol ethyl ether, diethylene glycol butyl ether, diethylene glycol hexyl ether, polypropylene glycol ethers such as propylene glycol monomethyl ether, dipropylene glycol monomethyl ether, tripropylene glycol monomethyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monopropyl ether, propylene glycol phenyl ether, trimethylpentanediol diisobutyrate, polytetrahydrofuran(s), polyether polyol(s)polyester polyol(s), and also derivatives thereof and mixtures thereof. They are present preferably in an amount in the range from 0.1 to 30 g/L, based on solids including active ingredients, and more preferably in an amount in the range from 1 to 10 g/L or from 2 to 5 g/L in the aqueous composition.

In contrast to filming, which may take place at comparatively low temperatures such as, for example, at temperatures in the range above about 5° C., temperatures of at least 50° C. are normally needed for the crosslinking for organic coatings which crosslink chemically or chemically-thermally. It is preferred to select film-forming assistants and to add them in an amount such that the composition films preferably at temperatures greater than 5° C., more preferably greater than 10° C., greater than 20° C., or greater than 40° C., more particularly greater than 60° C., greater than 80° C., greater than 100° C., or greater than 120° C. Accordingly it is preferred for the minimum film-forming temperature of the synthetic resins, including film-forming assistants, to film at temperatures greater than 40° C., more preferably greater than 60° C., greater than 80° C., greater than 100° C., or greater than 120° C. The simultaneous and/or subsequent drying takes place preferably at slightly higher (=at at least 20° C.) or significantly higher, preferably at least 30, 50, 70, 90, or 110° C., temperatures than the minimum film-forming temperature of the synthetic resins, including film-forming assistants. In the course of drying, water and, where present, organic solvents escape. This is usually accompanied by the onset of film formation, where the organic substances, optionally in particulate form, are able to take up positions more close to one another, become softer as a result of the higher temperature, and can form an impervious film. It is particularly preferred for filming to take place to a substantial degree even at room temperature.

Crosslinking, especially of resins, may take place, for example, with certain reactive groups such as, for example, isocyanate, isocyanurate and/or melamine groups. As crosslinkers it is possible independently of one another to use the following: inorganic crosslinkers such as those based on zirconium compounds, such as ammonium zirconium carbonate, for example, and/or organometallic crosslinkers such as those based on organotitanate, such as diisopropyl ditriethanolaminotitanate, for example, and/or those based on organozirconate, and/or organic crosslinkers such as adipic dihydrazide, those based on aziridine, such as polyfunctional polyaziridine, those based on an azo compound, or based on diamine, or based on diimide, such as multifunctional polycarbodiimides, for example, those based on formaldehyde, such as urea-formaldehyde and/or melamine-formaldehyde, those based on imidazole, such as 2-ethyl-4-methylimidazole, those based on isocyanate, those based on isocyanurate, those based on melamine, such as, for example, methoxymethyl-methylol-melamine and/or hexamethoxymethyl-melamine, those based on peroxide, those based on triazine, such as, for example, tris(alkoxycarbonylamino)triazine, and/or those based on triazole. They are preferably present in an amount in the range from 0.1 to 30 g/L, based on solids, including active ingredients, and more preferably in an amount in the range from 1 to 10 g/L or from 2 to 5 g/L, in the aqueous composition.

It is usual here to use organic crosslinkers based on melamine-formaldehyde in a temperature range from about 130 to about 210° C., preferably in the range from 140 to about 200° C., whereas the other organic crosslinkers are mostly or typically used in a temperature range approximately from 50 to about 120° C., preferably in the range from about 60 to about 110 or to about 100° C. These latter crosslinkers are referred to here as organic low-temperature crosslinkers.

The secondary coat is preferably dried in a way such that, in particular, organic polymer particles that are present, especially as constituents of a dispersion, are able to film, so forming a largely or entirely homogeneous coating. In some embodiments the drying temperatures here can be selected at a sufficiently high level for the organic polymeric constituents to be able to crosslink.

In the context of the method of the invention, it is preferred in certain embodiments for a secondary coat including a high fraction of organic particles to be formed; it is preferred for this coat to be filmed and/or crosslinked in the course, for example, of drying. In some embodiments filming takes place even without the presence of film-forming assistants. In that case the particles of the coating, particularly if they are present predominantly or entirely in the form of organic polymers, can be filmed preferably to form a largely or entirely impervious coating, particularly in the course of drying. In this context it is often preferred for the drying temperature of a coating that consists primarily or wholly of organic polymers to be selected such that a largely or entirely impervious coating is formed. As and when necessary, at least one film-forming assistant can be added for the purpose of filming, especially an assistant based on at least one long-chain alcohol. In the case of embodiments having two or more secondary coats one above another, it is preferred first to apply all of the secondary coats in succession and to subject them thereafter, as and when necessary, to joint filming and/or crosslinking.

In the context of the present invention it is preferred in many cases for the drying, filming and/or crosslinking to take place in the temperature range from 5 to 350° C., from 8 to 200° C., from 10 to 150° C., from 12 to 120° C., or from 14 to 95° C., more preferably in the temperature range from 16 to 40° C., based on the oven temperature and/or based on Peak Metal Temperature (PMT). The selected temperature range is largely dependent on the nature and amount of the organic constituents and also, optionally, of the inorganic constituents, and also, optionally, on their film-forming temperatures and/or crosslinking temperatures.

The secondary coat preferably has a wet film thickness in the range from 5 to 120 μm or from 10 to 80 or from 15 to 50 μm, and after drying preferably has a dry film thickness in the range from 4 to 100 μm, from 6 to 80 μm, from 8 to 60 μm, from 10 to 45 μm, from 12 to 32 μm, from 14 to 28 μm, from 16 to 25 or from 18 to 20 μm.

In many embodiments, therefore, the quality of the secondary coat is dependent on the one hand substantially on the quality and on the thickness of the activating coat or of the activating coat that remains after rinsing, and on the other hand is substantially dependent on the physicochemical conditions such as, for example, on the consistency and on the composition of the aqueous composition to form the secondary coat.

It can be advantageous if the at least one activating substance of the activating coat does not have too high a diffusion rate into the aqueous composition when the secondary coat is being formed. The diffusion rate of the at least one activating substance of the activating coat can be limited on the one hand by using relatively large and/or bulky molecules, examples being the polyelectrolytes and/or chemically modified polyelectrolytes, or, on the other hand, by selecting salts having a relatively low solubility in water. The temperatures of the substrate provided with the activating coat and/or of the aqueous composition to form the secondary coat may also be used in order to influence the formation of the secondary coat.

The experimental results that exist suggest, surprisingly, that there is an optimum in relation to the formation of very thick secondary coats in the case of thick activating coats and of aqueous compositions of comparatively low concentration and intended to form a secondary coat; above and below this optimum concentration of the aqueous composition, the secondary coats that are formed are not quite so thick.

In the course of the further treatment of the coated substrates it is possible—as and when appropriate, independently of whether oil has or has not been applied—for, in particular, alkaline cleaning, acidic pickling and/or water rinsing to take place.

Coating with an anticorrosion primer such as a welding primer, for example, may allow additional protection from corrosion, particularly in cavities and difficult-to-reach parts of a substrate, and may also allow formability and/or joinability in the case, for example, of folding, adhesive bonding and/or welding. Following forming and/or joining, it is possible, as and when necessary, to employ a further coating, optionally also in a procedure according to the invention.

In industrial practice it would be possible for an anticorrosion primer to be used in particular when the substrate coated therewith, such as a metal panel, after being coated with the anticorrosion primer, is formed and/or joined to a further component, and if further coatings are not applied until after that. If additionally in this procedure an anticorrosion primer is applied beneath the activating coat and beneath the particle coating, the protection from corrosion that is produced is usually improved significantly.

In the case of rinsing of the substrates coated with activating agent and with the substances of the secondary coat, the intention is often to remove as little as possible of the secondary coat, and it must not be removed completely. It is therefore advantageous if the activating coat and/or the secondary coat are sufficiently rinse-resistant for such lines and procedures.

It is particularly preferred to coat the secondary coat, in a wet, damp or only slightly, initially dried state, with a subsequent coating in a wet-on-wet process.

Following the application of the activating coat and of the secondary coat, and optionally after the generation of a largely or entirely impervious coating from the activating and/or secondary coat, it is possible for the coat of an adhesive, primer and/or paint to be applied to this coat or coating, for example.

In certain embodiments it is particularly preferred, over the largely or entirely impervious coating, to apply at least one coat of a paint or even a paint system made up for example of basecoat and clearcoat, or any desired paint system. If thereafter a further organic coating is applied, it can be used to achieve coloration and/or matting or to enable joining. In other embodiments it may be preferable for the surfaces coated in this way to be formed and/or to be joined to at least one other component and/or for an adhesive layer and/or at least one adhesive molding to be applied prior to an adhesive bonding operation.

The treatment steps and the possible compositions before the activating step and after the formation of a secondary coat are well known to the skilled person and can be varied diversely.

The problem addressed by the present invention is also solved with a coating produced by the method of the invention.

The coating of the invention can be used with preference for coated substrates in the form of wire, wire mesh, strip, sheet, profile, panel, part of a vehicle or missile, element for a household appliance, element in the building industry, frame, guideboard element, radiator element or fencing element, molding of complex geometry, or small part such as, for example, bolt, nut, flange, or spring.

The coating of the invention or the substrate coated in accordance with the invention is used preferably in vehicle or aircraft construction, in the building industry, in appliance construction or in heating systems, and more particularly for components for vehicles such as vehicle bodies, for missiles, for architectural applications, for heating systems, and for household appliances.

In one embodiment of the method the following are employed:

Optionally a one-stage or multistage cleaning of the substrate, followed by at least one rinsing with water or with an aqueous rinsing liquid—application of an activating coat—at least one rinsing with water or with an aqueous rinsing liquid—application of a secondary coat comprising substances of the aqueous composition to form a secondary coat and optionally also comprising activating agent that has remained—optionally at least one rinsing with water or with an aqueous rinsing liquid—drying and in this case optionally also filming—optionally crosslinking of secondary coat at elevated temperature—optionally application of further coatings—optionally baking and crosslinking—optionally application of further coatings.

in one particular embodiment of the method the following are employed:

Alkaline cleaning of the substrate—rinsing with municipal water—rinsing with DI water—application of an activating coat—rinsing with DI water—application of a secondary coat comprising substances of the aqueous composition to form a secondary coat and optionally also comprising activating agent that has remained—rinsing with DI water—drying and in this case optionally also filming—optionally baking and crosslinking—optionally coating with further organic coating.

It has been found that on the surfaces coated with activating substance in accordance with the invention, subsequently, largely or wholly impervious secondary coats are formed, which together with the activating coat that has remained may have a coat thickness even in the range from 2 to 50 µm, more particularly a coat thickness in the range from 3 to 40 µm, from 4 to 30 µm, from 5 to 20 µm, from 6 to 15 µm or from 8 to 10 µm, more preferably a coat thickness in the range from 3 to 30 µm, from 4 to 25 µm, from 5 to 18 µm, from 6 to 12 µm or from 7 to 10 µm. The individual coatings may have such coat thicknesses before and/or after their filming and/or before their crosslinking.

In comparison to the coating processes described in WO 2010/054985 A1, the results according to the invention show that the present methods are technically far less costly and inconvenient and are substantially more effective for obtaining dry film thicknesses in the region of at least 2 µm, since with the compositions of WO 2010/054985 A1 the precipitation potential is substantially lower than in the case of the methods described here, and since a much thicker silane activating coat is necessary for a certain coat thickness than in the case of the coatings utilized here that contain activating agent such as, for example, a polyelectrolyte or salt such as a formate, for example. The reason is that, with the processes of WO 2010/054985 A1, it was possible, even in further experiments, to obtain total coat thicknesses for the activating coat and for the secondary coat together, under conditions that can normally be applied technically, only of up to 1 or 2 µm (see comparative examples).

In comparison to this it has been possible, with the present method of the invention, with a single secondary coat, to achieve dry film thicknesses of up to 65 µm; preferred secondary coat thicknesses in the range from 3 to 30 µm have been produced without problems.

It has emerged that the surfaces coated in accordance with the invention, from which, subsequently, largely or poorly impervious coatings were produced, could be produced in a significantly easier and significantly more cost-effective way than, for example, electrocoat coatings, autophoretic deposition coatings or powder coatings.

It has emerged, furthermore, that coatings produced in accordance with the invention are at least equivalent to the electrocoat, autophoretic deposition, and powder coatings, in terms of their properties, with a composition in line with present-day industrial practice.

It has surprisingly been found that the method of the invention can be operated in a simple way and without costly and inconvenient control; it is normally not necessary to apply any external electrical voltage.

Surprisingly it has been found that even anionic polyelectrolytes can lead to the precipitation of an anionically stabilized dispersion. Surprisingly it has been found that, conversely, even cationic polyelectrolytes can lead to the precipitation of a cationically stabilized dispersion.

The method of the invention can be used within a wide temperature range and in particular also at room temperature, if the subsequent drying is disregarded.

It has surprisingly been found that in the method of the invention no costly and inconvenient control measures are needed, with regard to the application of the activating agent, in order to obtain a uniform and homogeneous coating, and that, for a low level of consumption of chemicals, high-grade protective secondary coats are formed, which in preferred embodiments attain a thickness in the range from 500 nm to 30 µm.

It has surprisingly been found that the activating coats have been able, by means of corresponding surface-active modifications to the polymeric structure and the incorporation thereof into pretreatment formulations, to be anchored even more rinse-resistantly in the dipping, and without intermediate drying of the activating coat beforehand, on cleaned substrate surfaces.

It has also been possible to deposit corresponding rinse-resistant secondary coats by virtue of the activating coats of the invention. In one variant, the activating coats enabled a wet-on-wet dipping process for the entire application, consisting of activating coat, secondary coat, and necessary rinsing steps, and so the method of the invention can be employed as a substitute for a coating method with an electrodeposition coating material.

It has surprisingly been found that the method of the invention is a self-regulating process with regard to the deposition, especially of the secondary coat, which does not require any costly and inconvenient control measures and with which, at a low level of consumption of chemicals, high-grade protective coatings are formed.

It has surprisingly been found that the aqueous compositions used, not least the formulations used, for the deposition of a secondary coat, have been able to be converted, on a surface preconditioned with an activating coat, not only into largely impervious or fully impervious coatings, and into largely homogeneous or fully homogeneous coatings—in contrast to the same aqueous compositions applied to the surface without such an activating coat, but instead that it has also been possible to anchor the secondary coats rinse-resistantly on the surface.

It has surprisingly been found that depending on the selection of the substrate, of the different activating agents, and of the aqueous composition to form a secondary coat, it is possible to produce coatings of the invention which in terms of their paint adhesion and their corrosion control can be adapted individually to the particular requirements—for example, to particular levels of corrosion control and paint adhesion that make sense for the application.

It has surprisingly been found that as a result of the applied coat thickness of activating agent, the resultant coat thickness of the secondary coat has been able to be influenced in a controlled way: this means that a low level of coating with activating agent, remaining after rinsing, leads to a lower coat thickness for the secondary coat, and, conversely, that a higher coat thickness of activating coat results in a correspondingly high coat thickness of secondary coat.

In this context it has also been found that the amount of secondary coat applied does not increase further even when the residence time of the correspondingly activated substrates in the bath comprising the secondary coat is extended (self-regulation); this means that after a residence time of the activated samples in the bath that forms the secondary coat, in particular in the range from 1 to 10 minutes, there was no further increase in the coat thickness of the secondary coat as a result of a longer residence time of the activated substrates in the aforementioned bath.

In summary it was possible, by means of the coat thickness of the activating coat and the amount of the solids and active ingredients used in the secondary coat, to control the resultant complete coat thickness in a targeted way.

It has surprisingly been found that the secondary coats deposited in accordance with the invention typically formed homogeneous coats with uniform dry film thicknesses on a workpiece of complex shape, comparable with the quality of conventional, electrophoretically or autophoretically deposited paint coats.

It has also been surprisingly found that the baths containing the aqueous composition for the secondary coat, in spite of a high throughput of activated surfaces, exhibited excellent process stability, with no further precipitation reactions being observed apart from those on the activated surfaces. Here, after drying, coats of high quality were obtained, which are comparable with electrophoretic coatings.

There were therefore no instances of unwanted precipitation in the bath or on the walls of the plants, containers, and stirrer mechanisms, in spite of the high throughput of surfaces provided with activating agent.

A further particularly surprising effect of the present invention was found when a polyelectrolyte modified with a silane/silanol/siloxane is used as activating agent for producing the activating coat, especially in the case of polyelectrolytes modified with at least one alkoxysilane having epoxy and/or isocyanato groups and/or with at least one resultant silanol and/or siloxane formed therefrom.

In a particular range of proportions of silane(s) to activating agent, particularly good depositions are achieved; outside this range, only the conventional kind of silane deposition was found, but there was no longer any deposition of the activating agent, especially in the case of polyethyleneimines. This effect was found particularly for the reaction of an epoxysilane with a polyethyleneimine having a high molecular mass of preferably about 1.5 to 2.5 million Da.

For the case of polyethyleneimine in particular this was very surprising, since the assumption prior to the present invention, given the known reactivity of epoxides and amines, was that an increase in the amount of silane would also lead to ever greater deposition, through to complete deposition, of polyethyleneimine. The fact that this is not the case, however, but that instead it took place only within a certain proportion of silane to polyethyleneimine, was completely unexpected. In this context, a molar ratio of polyethyleneimine to silane approximately in the range from 1:(1000 to 5000) was used. The polyethyleneimine here was employed in the form of a randomly branched dendrimer.

Surprisingly it is also possible for anionic polyelectrolytes to lead to the precipitation of an anionically stabilized dispersion, and cationic polyelectrolytes can also lead to the precipitation of a cationically stabilized dispersion.

Also provided by the present invention, accordingly, is the use of a polyelectrolyte modified with at least one silane/silanol/siloxane, in particular of a polyelectrolyte modified with at least one alkoxysilane having epoxy and/or isocyanate groups and/or with at least one silanol and/or siloxane formed therefrom, as activating agent, consisting of polyethyleneimine and silane/silanol/siloxane in a ratio of 1:(1000 to 5000), calculated on the basis of the silane, in methods for the electroless coating of substrates, more particularly of metallic substrates.

Certain embodiments of the present invention are evident from variants A) to F) below, which can be combined with one another in any desired form:

A) Method for coating surfaces of substrates which may optionally have been precoated (=surfaces to be coated) with a first aqueous composition in the form of a solution, emulsion and/or suspension which comprises at least one water-dissolved salt and/or polyelectrolyte (activating agent), to form a first, salt- and/or polyelectrolyte-containing coat (activating coat), with the first coat, comprising salt and/or polyelectrolyte, being thereafter rinsed and/or dried, the first coat being contacted into a second aqueous composition in the form of a solution, emulsion and/or suspension, in particular in a dipping process, where the ions, complexes and/or compounds of the first coat are able optionally to diffuse into the second aqueous composition and/or to enter into interaction and/or into reaction, preferably precipitation reaction and/or salting-out reaction, and/or wherein the first coat is optionally at least partly dissolved, it not being absolutely necessary for substance of the first coat to be taken up into the new coating, but being taken up in many outcomes, with the second aqueous composition optionally comprising at least one precipitable substance, at least one kind of depositable particles and/or at least one depositable compound, which optionally enter into a precipitation reaction and/or salting-out reaction with the ions, complexes and/or compounds of the first coat, wherein a second coat (precipitation coat, secondary coat), optionally comprising precipitated and/or deposited substances, is formed on the first coat and/or in place of the first coat, and is thereafter rinsed, dried and/or further-coated, there being, overall, at least one-fold drying and/or treatment at a temperature in particular in the range from 10 to 170° C. and/or chemically, in order to apply and/or fix the substances on the substrate, and the dry film formed, comprising the first and second coats, has a thickness of at least 1 μm or 2 μm.

B) Method for coating surfaces of substrates which may optionally have been precoated (=surfaces to be coated) with a first aqueous composition in the form of a solution, a colloidal solution, emulsion and/or suspension which comprises at least one permanently cationic and/or latently cationic organic polymer and/or copolymer, which is in solution in water and has a chain, a backbone and/or a dendrimer based on polyethyleneimine, polyvinylamine and/or chitosan, and/or derivatives thereof and/or modifications thereof, wherein a first coat (activating coat) is formed which comprises at least one permanently cationic and/or latently cationic polymer and/or copolymer, wherein the first coat is thereafter rinsed and/or dried, wherein the first coat is contacted with a second aqueous composition, which in particular is a solution or is in colloidal form, in particular in a dipping process, wherein the first coat is optionally at least partly dissolved and/or detached and/or wherein the ions, complexes and/or compounds of the first coat are able optionally to diffuse at least partly in each case into the second aqueous composition, to be incorporated therein and/or to enter therewith into interaction, especially electrostatic and/or complex-forming interaction, and/or into reaction, preferably precipitation reaction and/or salting-out reaction, and/or wherein the first coat is optionally at least partially dissolved, with optionally at least one substance of the first coat being taken up into the new coating, wherein the second aqueous composition optionally comprises at least one precipitable substance, at least one kind of depositable particles and/or at least one depositable compound which enters optionally into a precipitation reaction and/or salting-out reaction with the ions, complexes and/or compounds of the first coat, wherein a second coat comprising precipitated and/or deposited substances is formed on the first coat and/or, after at least partial dissolution and/or detachment of the first coat, on the surfaces that are to be coated or on the remainder of the first coat, and which is thereafter rinsed, dried and/or further-coated, there being, overall, at least one-fold drying and/or treatment at a temperature in particular in the range from 10 to 170° C., physically and/or chemically, in order to form and/or fix the substances on the surfaces to be coated, in a coat or in a coat sequence.

C) Method according to one of the preceding variants, wherein the activating coat is generated by means of dip coating.

D) Aqueous composition which comprises at least one permanently cationic and/or latently cationic organic polymer and/or copolymer which is in solution in water and which has a chain, a backbone and/or a dendrimer based on polyethyleneimine, polyvinylamine and/or chitosan, and/or derivatives thereof and/or modifications thereof.

E) Use of a method for electroless coating according to any of variants A) to C) for the coating of strips, sheets, profiles, parts and/or for the production of vehicle components, of architectural components, vehicle bodies, and household appliances.

F) Use of a composition according to variant D for the coating of strips, sheets, profiles, parts and/or for the production of vehicle components, of architectural components, vehicle bodies, and household appliances.

Substrates employed, accordingly, for the purposes of the present invention include more particularly strips, sheets, profiles, parts preferably for the production of vehicle components, of architectural components, vehicle bodies, and components for household appliances.

Other variants of the present invention are as follows:

V1. Method for electroless coating of substrates, comprising or consisting of the following steps:
  I. provision of a substrate,
  II. optional cleaning of the substrate,
  III. application of an activating coat,
  IV. optional intermediate drying of the activating coat,
  V. rinsing of the activating coat,
  VI. coating of the activated surfaces with formulations and/or dispersions for forming an organic secondary coating,
  VII. rinsing of the secondary coating,
  VIII. drying and/or crosslinking of the coating,
  characterized in that the activating coat is formed from a substance or mixture of substances selected from the group consisting of polyethyleneimine, silane-modified polyethyleneimine, polyethyleneimine modified with silane compound(s), polyvinylamine, silane-modified polyvinylamine, polyvinylamine modified with silane compound(s), chitosan, silane-modified chitosan, chitosan modified with silane compound(s), and mixtures thereof,
  with the proviso that when using unmodified polyethyleneimine the intermediate drying IV. is obligatory
  or characterized in that the activating coat is formed from a substance or mixtures of substances selected from the group consisting of chitosan, calcium acetate, calcium formate, and mixtures thereof.

V2. Method according to V1, characterized in that step III. the activating coat is formed from a substance or mixture of substances selected from the group consisting of silane-modified polyethyleneimine, polyethyleneimine modified with silane compound(s), polyvinylamine, silane-modified polyamine, polyvinylamine modified with silane compound(s), chitosan, silane-modified chitosan, chitosan modified with silane compound(s), and mixtures thereof.

V3. Method according to V1 or V2, characterized in that in step I. a metallic substrate selected from the group consisting of aluminum, iron, copper, titanium, zinc, tin and/or alloys and/or mixtures thereof is used, preferably consisting of steel, copper, aluminum, alloys therewith or thereof, more preferably consisting of steel or aluminum.

V4. Method according to any of variants V1 to V3, characterized in that in step VI. the formulations and/or dispersions for forming an organic secondary coating are selected from the group consisting of
  A) anionically stabilized aqueous polymer particle dispersions,
  B) anionically stabilized aqueous formulations, and mixtures thereof.

V5. Method according to any of variants V1 to V4, characterized in that polysiloxanes are used as modifying silane compounds.

V6. Method according to any of variants V1 to V5, characterized in that the activating agent has been prepared by reaction of silane and/or silane compounds and polyethyleneimine in a ratio of 1:1.

V7. Use of polyethyleneimine, polyvinylamine and/or chitosan as activating agents in methods for electroless coating of substrates, more particularly metallic substrates.

V8. Use according to V7, characterized in that polyethyleneimine, polyvinylamine and/or chitosan have been modified with silane and/or silane compounds.

V9. Use according to V8 of an activating agent modified with silane and/or silane compounds, characterized in that the activating agent has been prepared by reaction of silane and/or silane compounds and polyethyleneimine in a ratio of 1:1.

V10. Method for electroless coating of substrates, comprising or consisting of the following steps:
  I. provision of a substrate,
  II. optional cleaning of the substrate,
  III. application of an activating coat,
  IV. optional intermediate drying of the activating coat,
  V. rinsing of the activating coat,
  VI. coating of the activated surfaces with formulations and/or dispersions for forming an organic secondary coating,
  VII. rinsing of the secondary coating,
  VIII. drying and/or crosslinking of the coating,
  characterized in that the activating coat is formed from one or more anionic polyelectrolytes selected from the group consisting of polyacrylic acid, silane-modified polyacrylic acid, polyacrylic acid modified with silane compound(s), polyacrylic acid-maleic acid copolymer, silane-modified polyacrylic acid-maleic acid copolymer, polyacrylic acid-maleic acid copolymer modified with silane compound(s), polyacrylic acid-acrylamide copolymer, silane-modified polyacrylic acid-acrylamide copolymer, polyacrylic acid-acrylamide copolymer modified with silane compound(s), polystyrenesulfonic acid, polyvinylsulfonic acid, polyphosphoric acid, and mixtures thereof.

V11. Method according to V10, characterized in that in step III. the activating coat consists of a substance or mixture of substances selected from the group consisting of polyacrylic acid, silane-modified polyacrylic acid, polyacrylic acid modified with silane compound(s), polyacrylic acid-maleic acid copolymer, silane-modified polyacrylic acid-maleic acid copolymer, polyacrylic acid-maleic acid copolymer modified with silane compound(s), polyacrylic acid-acrylamide copolymer, silane-modified polyacrylic acid-acrylamide copolymer, polyacrylic acid-acrylamide copolymer modified with silane compound(s), and mixtures thereof, preferably from the group consisting of silane-modified polyacrylic acid, polyacrylic acid modified with silane compound(s), silane-modified polyacrylic acid-maleic acid copolymer, polyacrylic acid-maleic acid copolymer modified with silane compound(s), silane-modified polyacrylic acid-acrylamide copolymer, polyacrylic acid-acrylamide copolymer modified with silane compound(s), and mixtures thereof.

V12. Method according to V10 or V11, characterized in that in step I. a metallic substrate selected from the group consisting of aluminum, iron, copper, titanium, zinc, tin and/or alloys and/or mixtures thereof is used, preferably consisting of steel, copper, aluminum, alloys therewith or thereof, more preferably consisting of steel or aluminum.

V13. Method according to any of variants V10 to V12, characterized in that in step VI. the formulations and/or dispersions for forming an organic secondary coating are selected from the group consisting of
A) cationically stabilized aqueous polymer particle dispersions,
B) cationically stabilized aqueous formulations,
and mixtures thereof.

V14. Method according to any of variants V10 to V13, characterized in that polysiloxanes are used as modifying silane compounds.

V15. Use of polyacrylic acid, silane-modified polyacrylic acid, polyacrylic acid modified with silane compound(s), polyacrylic acid-maleic acid copolymer, silane-modified polyacrylic acid-maleic acid copolymer, polyacrylic acid-maleic acid copolymer modified with silane compound(s), polyacrylic acid-acrylamide copolymer, silane-modified polyacrylic acid-acrylamide copolymer, polyacrylic acid-acrylamide copolymer modified with silane compound(s), polystyrenesulfonic acid, polyvinylsulfonic acid, polyphosphoric acid and mixtures thereof, preferably polyacrylic acid, silane-modified polyacrylic acid, polyacrylic acid modified with silane compound(s), polyacrylic acid-maleic acid copolymer, silane-modified polyacrylic acid-maleic acid copolymer, polyacrylic acid-maleic acid copolymer modified with silane compound(s), polyacrylic acid-acrylamide copolymer, silane-modified polyacrylic acid-acrylamide copolymer, polyacrylic acid-acrylamide copolymer modified with silane compound(s), and mixtures thereof
as activating agent in methods for electroless coating of substrates, more particularly metallic substrates.

V16. Method for electroless coating of substrates, comprising or consisting of the following steps:
I. provision of a substrate,
II optional cleaning of the substrate,
III. application of an activating coat,
IV. optional intermediate drying of the activating coat,
V. rinsing of the activating coat,
VI. coating of the activated surfaces with formulations and/or dispersions for forming an organic secondary coating,
VII. rinsing of the secondary coating,
VIII. drying and/or crosslinking of the coating,
characterized in that
the polyelectrolytes of the secondary coating, either completely or to an extent of at least 80% by weight, preferably at least 90% by weight, have the same charge sign as the activating agents used in step III.

V17. Method according to variant V16, characterized in that
a) chitosan, calcium acetate, calcium formate, or mixtures thereof is or are used as cationic activating agent.

V18. Method according to variant V16, characterized in that
b) polyacrylic acid and/or polyphosphoric acid are or is used as anionic activating agent.

The various embodiments of the present invention, for example but not exclusively those of the various dependent claims, may be combined with one another in any desired way.

DESCRIPTION OF THE FIGURES

The invention is now elucidated with reference to the following, nonlimiting examples and to the figures, the figures showing SEM micrographs of the coat stack comprising cationic activating coat and of the secondary coat comprising originally anionically stabilized substances.

INVENTIVE EXAMPLES (B) AND COMPARATIVE EXAMPLES (VB)

Figure 1:
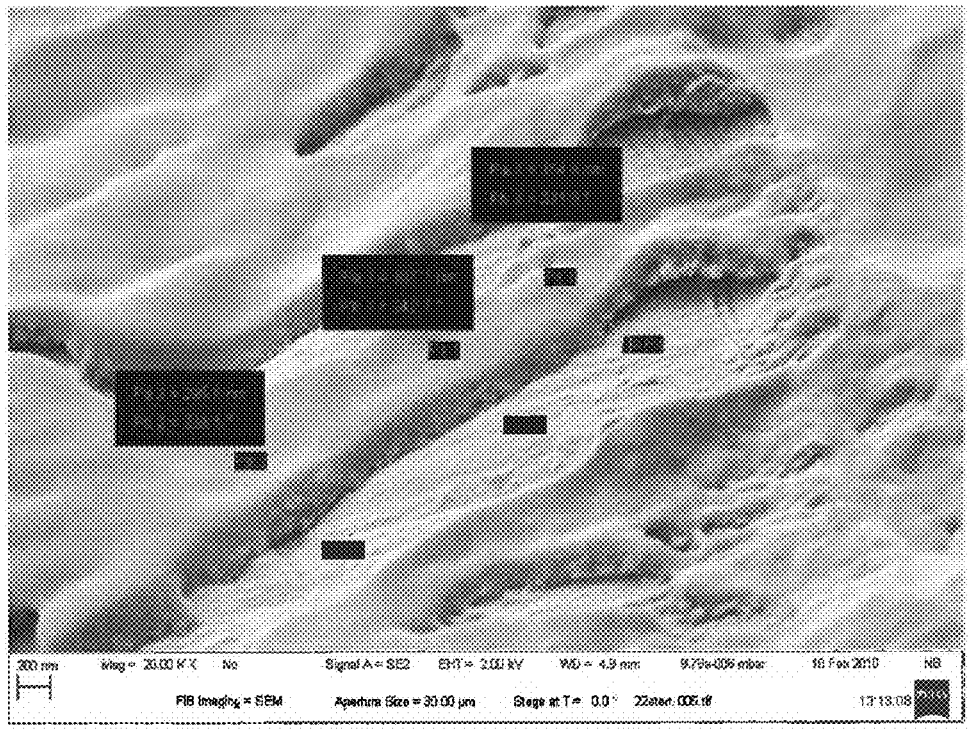
FIG. 1 shows an SEM image of a substrate according to example B9, coated with activating agent 3, a silane group-modified polyethyleneimine, and having an activating coat comprising a silane-modified cationic polyelectrolyte with a dry film thickness of around 0.2 µm.
Figure 2:
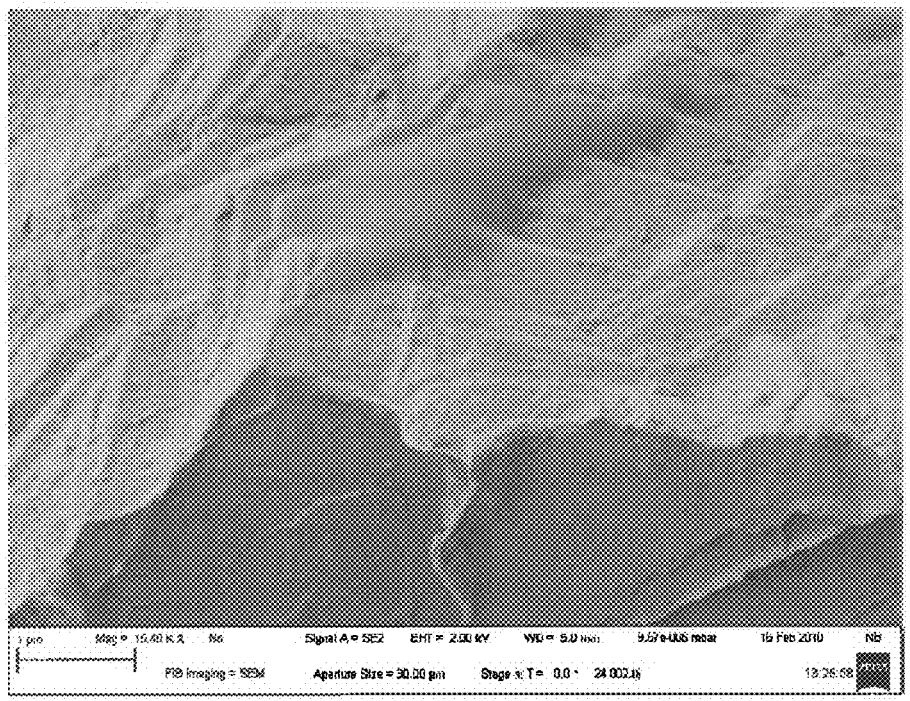
FIG. 2 shows an SEM image of a substrate coated with a secondary coat 1(30), without activating agent, as per comparative example VB13. The SEM micrograph shows a cleaned metal panel which without formation of an activating coat had been dipped into the aqueous composition, to form the secondary coat, and rinsed. Since there was no activating coat, there was also no formation of a secondary coat.
Figure 3:
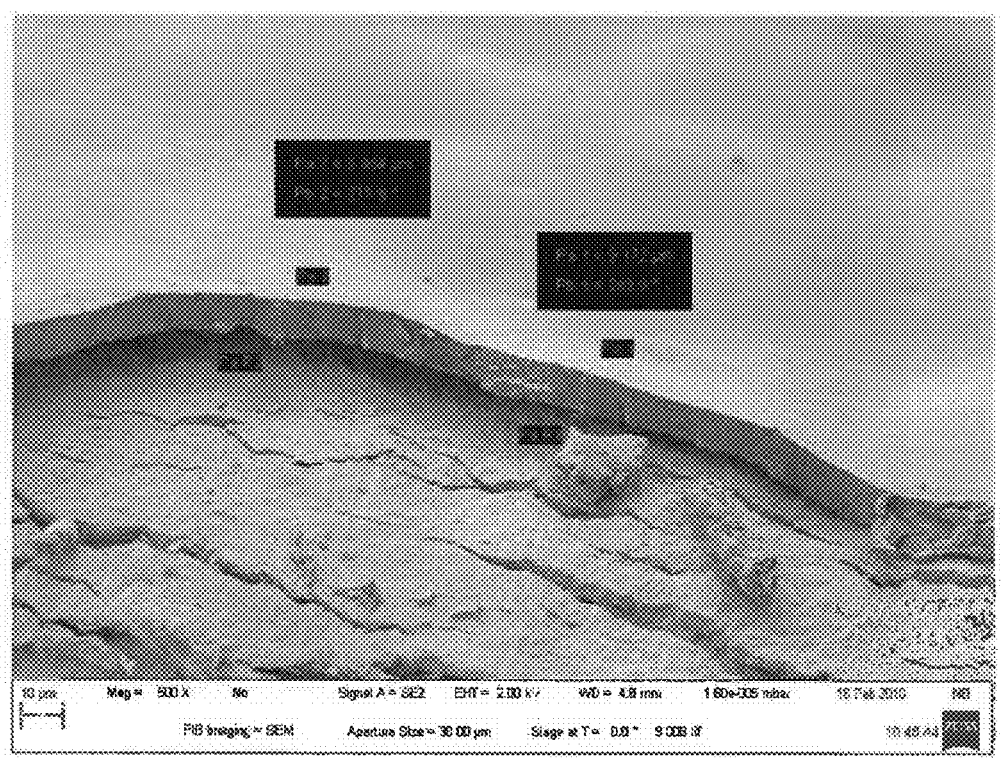
FIG. 3 shows an SEM image of a substrate according to example B23, coated with activating agent 3 and a secondary coat 1(30), with dispersion 1 in a concentration of 30% by weight. Because of the activating coat, it was possible over 5 minutes to form a secondary coat with a dry film thickness of approximately 9 to 10 µm.
Figure 4:
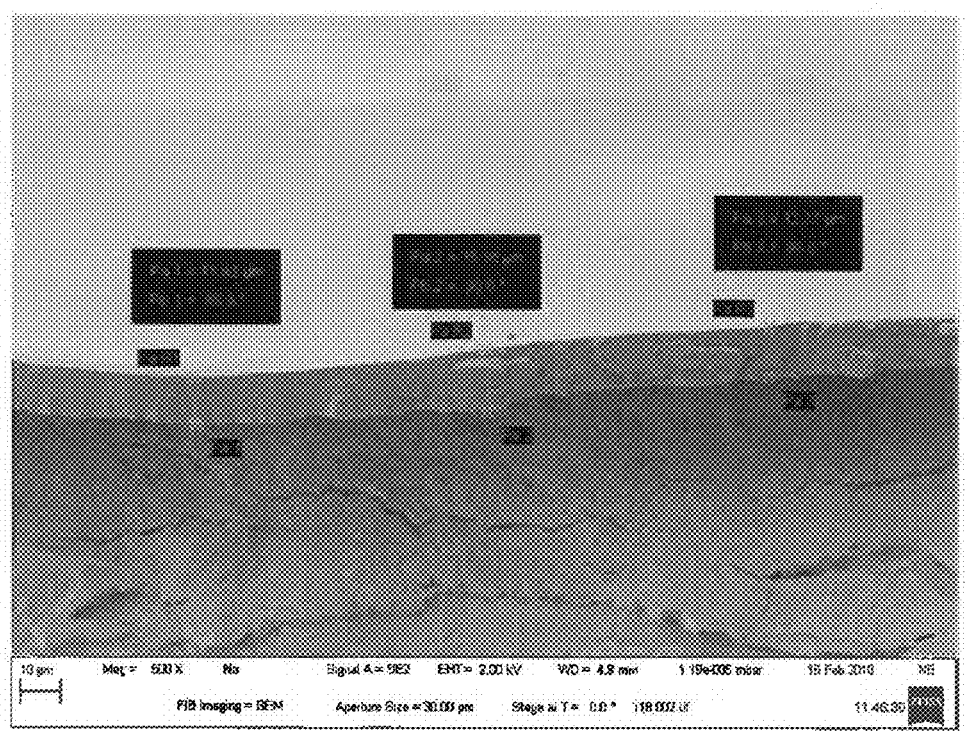
FIG. 4 shows an SEM image of a substrate according to example B26, coated with activating agent 3 and a secondary coat 1(20). For this purpose, the secondary coat was formed with dispersion 1 in a concentration of 20% by weight. Because of the activating coat, it was possible over 5 minutes to form a secondary coat with a dry film thickness of approximately 11 to 16 µm. In spite of the lower concentration of dispersion 1 in comparison to FIG. 3, a significantly thicker secondary coat was formed.
Figure 5:
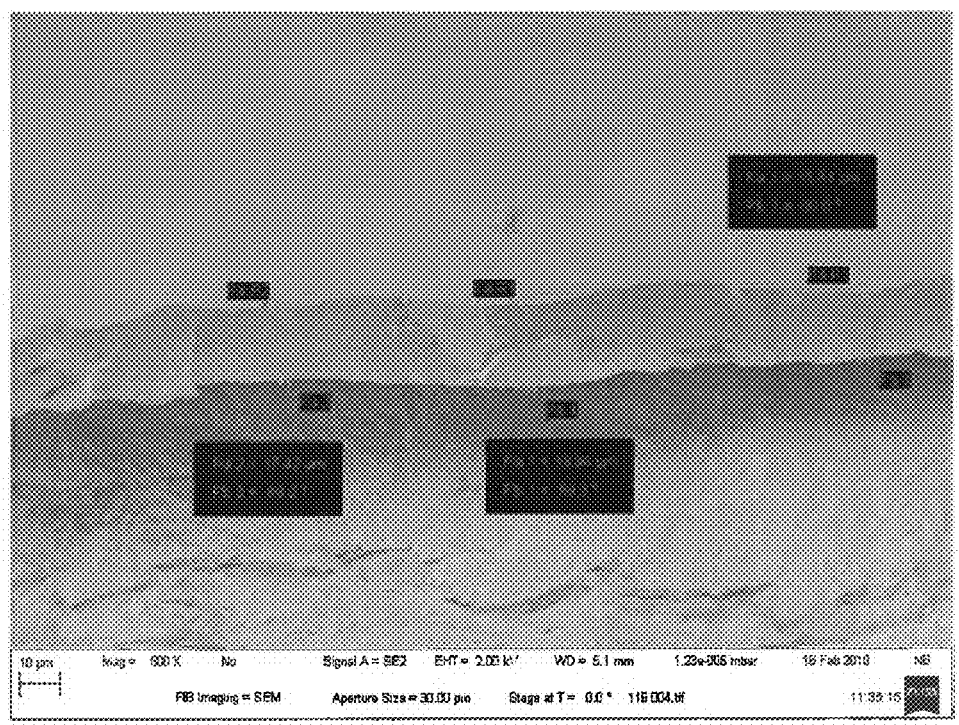
FIG. 5 shows an SEM image of a substrate according to example B26, coated with activating agent 3 and a secondary coat 11(20). For this purpose, the secondary coat was formed with dispersion 11 in a concentration of 20% by weight. Because of the activating coat, it was possible over 5 minutes to form a secondary coat with a dry film thickness of approximately 15 to 20 µm. In spite of the equally high concentration of dispersion 11 in comparison to dispersion 1 from FIG. 4, a significantly thicker secondary coat was formed. This indicates that the dry film thickness, for a given deposition time, is dependent on specific physicochemical properties of the dispersion.
Figure 6:
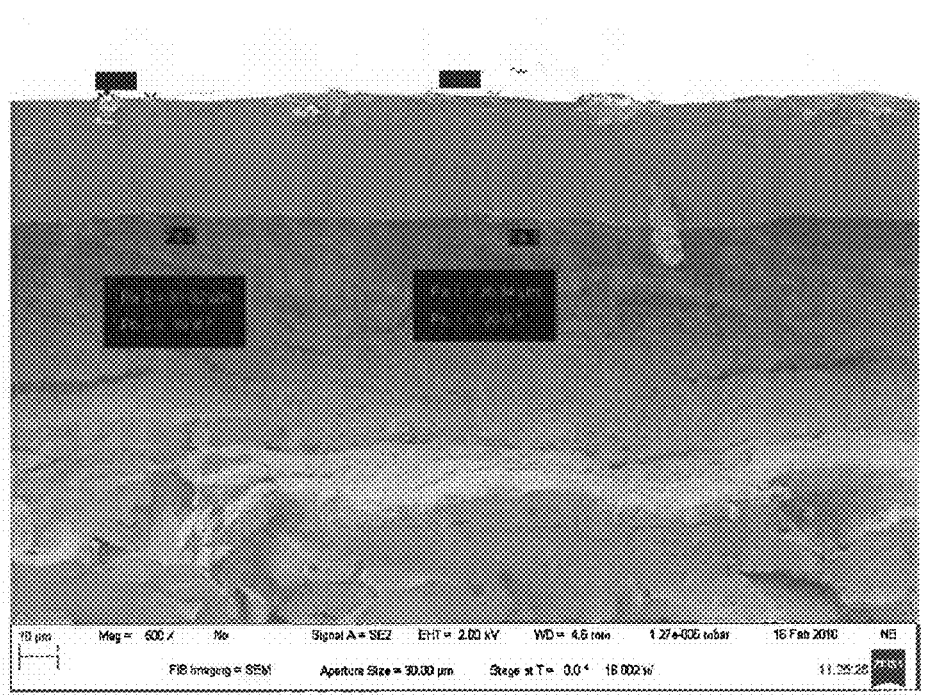
FIG. 6 shows an SEM image of a substrate according to example B29, coated with activating agent 3 and a secondary coat 1(10). For this purpose the secondary coat was formed with dispersion 1 in a concentration of 10% by weight. Consequently almost all of the conditions are identical with those for FIGS. 3 and 4. Because of the activating coat, it was possible over 5 minutes to form a secondary coat having a dry film thickness of 60 to 64 µm. In spite of the further-reduced concentration of dispersion 1 in comparison to dispersion 1 from FIGS. 3 and 4, a significantly thicker secondary coat was formed on the same substrate under otherwise identical conditions. This again indicates that the dry film thickness, for a given deposition time, is dependent on specific physicochemical properties of the dispersion.
Figure 7:
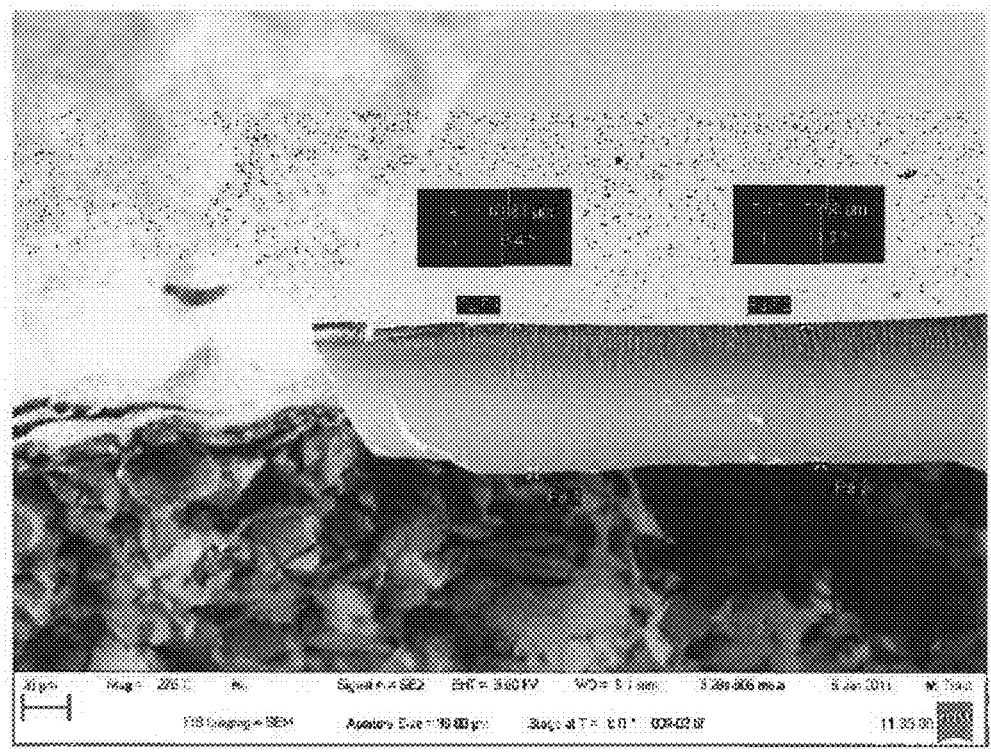
FIG. 7 shows an SEM image for example B47 with a secondary coat, for which a secondary coat was formed on an activating coat comprising cationic salt, the secondary coat having a thickness in the range from 59 to 64 µm.

1.) Examples B1 to B45 for Cationic Polyelectrolytes as Activating Agents:
I. Substrate Type (Metal Sheets):
1: Electrolytically galvanized steel sheet with a zinc coat add-on of 5 µm, sheet thickness 0.81 mm.
2: Hot-dip-galvanized steel sheet, sheet thickness about 0.8 mm.
3: Cold-rolled steel, sheet thickness about 0.8 mm.
4: Aluminum alloy of quality class AC 170, sheet thickness about 1.0 mm.

Different kinds of aqueous formulations and dispersions were prepared for contacting and/or coating these sheets. The different substrates did not show any significant differences in coating behavior.
II. Alkaline Cleaning:
1: 30 g/L alkaline, silicate-free cleaner Gardoclean® S 5176 and also 4 g/L Gardobond®Additive H 7406 for suppressing foaming during spraying, from Chemetall GmbH, were prepared in municipal water for a pH of 10.5, giving only a moderate pickling attack. The sheets were cleaned by spraying at 60° C. for 180 seconds, and then rinsed for 120 seconds with municipal water and thereafter for 120 seconds with deionized water, by dipping.
III. Activation:
Activation is used to apply a homogeneous secondary coat, with the aqueous activating agent comprising the substances required for precipitation, coagulation, salting-out and/or deposition, and/or consisting, besides water, of the substances below. Coating took place with the following activating agents at room temperature over 2.5 minutes:
1: Cationic polyethyleneimine. Average molecular weight 750 000 Da. Amount of solids and active ingredients: 5% by weight.
2: Cationic polyethyleneimine. Average molecular weight 2 million Da. Amount of solids and active ingredients: 5% by weight.
3: Epoxysilane-modified cationic polyethyleneimine with an average molecular weight of about 2 million Da: in this case a pretreatment solution with a prehydrolyzed alkoxysilane having amino groups was mixed with a 5% strength polyethyleneimine solution in the presence of cations such as zirconium, and the mixture was then applied to the metallic substrate by dipping. However, the activating substance was not dried on the sheets, but was instead applied wet-on-wet without initial drying. In contrast to activating agent 2, no intermediate drying is necessary before the rinsing of the activating coat in order to form rinse-resistant activating coats.
3 (blade-coated): The same activating agent 3 was now applied by doctor blade. The necessary coat thickness of activator 3 was applied to the substrates in a controlled way by means of liquid application and doctor blade. In the case of examples 30 and 31 in table 3 it is made clear that by blade coating it is possible to set the thickness of the activating coat, but also that a thicker activating coat allows the formation of a thicker secondary coat.
4: Activation based on Oxsilan® from Chemetall—status as described in WO 2010/054985 A1—comparative example.
5: Activation based on Oxsilan® from Chemetall—ongoing development relative to status as described in WO 2010/054985 A1—comparative example.
6: 5 g of copolymer of vinylpyrrolidone (VP) and quaternized vinylimidazole. Molar electrostatic capacity MEQ of the polyelectrolyte, with higher values often indicating a higher molecular charge. At pH 7:1.0 meq/g. Average molecular weight Mw=200 000 Da. Diluted in 100 mL of deionized water. Amount of solids and active ingredients: 13% by weight.
7: 5 g of copolymer of vinylpyrrolidone (VP) and quaternized vinylimidazole. MEQ at pH 7:3.0 meq/g. Mw=400 000 Da. Diluted in 100 mL of deionized water. Amount of solids and active ingredients: 20% by weight.
8: 5 g of copolymer of vinylpyrrolidone (VP) and quaternized vinylimidazole. MEQ at pH 7:6.1 meq/g. Mw=40 000 Da. Diluted in 100 mL of deionized water. Amount of solids and active ingredients: 40% by weight.
9: 5 g of copolymer of vinylcaprolactam (VCap), vinylpyrrolidone (VP), quaternized vinylimidazole (QVI). MEQ at pH 7:0.5 meq/g. Mw=700 000 Da. Diluted in 100 mL of deionized water. Amount of solids and active ingredients: 20% by weight.
10: Cationic polyvinylamine. Average molecular weight 45 000 Da., amount of solids and active ingredients: 5% by weight.
11: Cationic polyvinylamine. Average molecular weight 340 000 Da., amount of solids and active ingredients: 5% by weight.
12: Silane group-modified cationic polyvinylamine—average molecular weight 340 000 Da. In this case a prehydrolyzed pretreatment solution with a prehydrolyzed alkoxysilane having amino groups was mixed with a 5% strength polyethyleneimine solution in the presence of cations such as zirconium, but not dried on the sheets (wet-on-wet application), and then applied to the metallic substrate by dipping. In contrast to activating agent 11, there is no need for intermediate drying before the activating coat is rinsed, in order to form rinse-resistant activating coats.
13: Aqueous solution consisting of chitosan from Sigma Aldrich HMW and Fluka LMW. pH: 3. Concentration of 1% by weight, molecular weight chitosan from 5000 g/mol to 2 000 000 g/mol.
14: Aqueous solution consisting of silane group-modified chitosan from Sigma Aldrich HMW and Fluka LMW. pH: 3. Concentration of 1% by weight, molecular weight of chitosan from 5000 g/mol to 2 000 000 g/mol. In this case a prehydrolyzed pretreatment solution based on an amino-alkoxysilane was mixed with a 5% strength chitosan solution in the presence of cations such as zirconium, but not dried, and was then applied wet-on-wet to the metallic substrate by dipping.

IV. Intermediate Drying of the Activating Coat:

In the course of the experiments it was found that an intermediate drying step may possibly have an influence on the thickness of the secondary coat, since smaller amounts of the activating coat were removed in the subsequent rinsing step V after an intermediate drying.

1: Drying at 40° C. for 15 minutes in a drying cabinet with forced air and fresh-air supply.

V. Rinsing of the Activating Coat:

One-fold rinsing by immersion of the coated substrates into a gently agitated bath of deionized water over 2 minutes at room temperature.

Since part of the fresh coating is rinsed off in the course of the rinsing operation, in some outcomes the remaining amounts of the activating coat were ascertained, together with element amounts of the remainders of cleaning agents, of the pretreatment coat, of the anticorrosion primer coat, etc. It proved advantageous if as high as possible a fraction of the activating coat is retained during rinsing.

The amounts of elements in the activating coat were determined by means of X-ray fluorescence analysis (XFA) for the activating coat, including the amounts from previous treatments—where present. The figures relate to the element contents after rinsing. With these figures it was possible to estimate the remaining coat thicknesses and to compare them from sample to sample, it being made clear that in spite of intensive rinsing, comparatively high fractions of the activating coat are retained. These amounts are sufficient to provide the activated surface with effective preparation for the subsequent treatment steps VI. and VII.

Parallel investigations by scanning electron microscopy (SEM) made it clear that impervious coatings were formed from the combination of the contacting with activating agent and subsequent coating with the formulation for the secondary coat.

VI. Coating of the Activated Surfaces with Formulations and/or Dispersions for Forming a Secondary Coat:

The secondary coat was formed by dipping the coated substrate into a gently agitated bath of the dispersion or formulation at room temperature for 5 minutes in each case.

An indication such as, for example, "1(30)" is intended here to show that composition 1 is used in a concentration of 30% by weight of the solids and active ingredients.

A) Anionically Aqueous Polymer Particle Dispersions:

1 (30): Polyurethane dispersion A from Alberdingk-Boley. Average particle size $d_{50}$ 150 nm. Viscosity 20-400 mPa·s. Zeta potential −50 mV. Minimum film-forming temperature 25° C. pH 7-8. Amount of solids and active ingredients 30% by weight.

1 (20): Polyurethane dispersion A from Alberdingk-Boley. Average particle size $d_{50}$ 150 nm. Viscosity 20-400 mPa·s. Zeta potential −50 mV. Minimum film-forming temperature 25° C. pH 7-8. Amount of solids and active ingredients 20% by weight.

1 (10): Polyurethane dispersion A from Alberdingk-Boley. Average particle size $d_{50}$ 150 nm. Viscosity 20-400 mPa·s. Zeta potential −50 mV. Minimum film-forming temperature 25° C. pH 7-8. Amount of solids and active ingredients 10% by weight.

2 (30): Oxidatively drying polyester-polyurethane dispersion B from Bayer Materials Science AG. Average particle size $d_{50}$ 125 nm. Viscosity 200-350 mPa·s. Zeta potential −60 mV. Minimum film-forming temperature 10-15° C. pH 7.2. Amount of solids and active ingredients 30% by weight.

2 (20): Oxidatively drying polyester-polyurethane dispersion B from Bayer Materials Science AG. Average particle size $d_{50}$ 125 nm. Viscosity 200-350 mPa·s. Zeta potential −60 mV. Minimum film-forming temperature 10-15° C. pH 7.2. Amount of solids and active ingredients 20% by weight.

2 (10): Oxidatively drying polyester-polyurethane dispersion B from Bayer Materials Science AG. Average particle size $d_{50}$ 125 nm. Viscosity 200-350 mPa·s. Zeta potential −60 mV. Minimum film-forming temperature 10-15° C. pH 7.2. Amount of solids and active ingredients 10% by weight.

3 (20): Dispersion C based on polyacrylate. Average particle size $d_{50}$ 125 nm. Viscosity 400 mPa·s. Zeta potential −65 mV. Minimum film-forming temperature 19° C. pH 8. Amount of solids and active ingredients 20% by weight.

4 (20): Dispersion D based on polyacrylate. Average particle size $d_{50}$ 150 nm. Viscosity 20 mPa·s. Zeta potential −51 mV. Minimum film-forming temperature 40° C. pH 8. Amount of solids and active ingredients 20% by weight.

5 (20): Polyether-polyurethane dispersion E from Bayer Materials Science AG. Average particle size $d_{50}$ 250-500 nm. Viscosity 100 mPa·s. Zeta potential −57 mV. Minimum film-forming temperature 20° C. pH 7-8.5. Amount of solids and active ingredients 20% by weight.

6 (20): Polyester-polyurethane dispersion F from Bayer Materials Science AG. Average particle size $d_{50}$ 200-400 nm. Viscosity 200 mPa·s. Zeta potential −50 mV. Minimum film-forming temperature 25° C. pH 7-8. Amount of solids and active ingredients 20% by weight.

7 (20): Anionic and nonionic polyester-polyurethane dispersion G from Bayer Materials Science AG. Average particle size $d_{50}$ 140 nm. Viscosity 80 mPa·s. Zeta potential −83 mV. Minimum film-forming temperature 30° C. pH 6-8. Amount of solids and active ingredients 20% by weight.

8 (20): Anionic and nonionic dispersion H from Bayer Materials Science AG. Average particle size $d_{50}$ 120 nm. Viscosity 110 mPa·s. Zeta potential −80 mV. Minimum film-forming temperature 15° C. pH 7. Amount of solids and active ingredients 20% by weight.

9 (20): Anionic and nonionic dispersion I from Bayer Materials Science AG. Average particle size $d_{50}$ 170 nm. Viscosity 90 mPa·s. Zeta potential −84 mV. Minimum film-forming temperature 30° C. pH 7. Amount of solids and active ingredients 20% by weight.

10 (20): Anionic and nonionic dispersion J from Bayer Materials Science AG. Average particle size $d_{50}$ 110 nm. Viscosity 40 mPa·s. Zeta potential −82 mV. Minimum film-forming temperature 25° C. pH 7. Amount of solids and active ingredients 20% by weight.

B) Anionically Stabilized Aqueous Formulations:

11 (20): One-component, anionically stabilized paint formulation based on epoxy resin deposition paint. Amount of solids and active ingredients 20% by weight.

11 (10): One-component, anionically stabilized paint formulation based on epoxy resin deposition paint. Amount of solids and active ingredients 10% by weight.

12 (20): Anionic dispersion formulated with $TiO_2$. Amount of solids and active ingredients 20% by weight. Average particle size $d_{50}$ 150 nm.

12 (10): Anionic dispersion formulated with $TiO_2$. Amount of solids and active ingredients 10% by weight. Average particle size $d_{50}$ 150 nm.

VII. Rinsing of the Secondary Coat:

The purpose of rinsing after the secondary coat was to remove uncoagulated and/or unprecipitated constituents of the aqueous composition and their accumulations, and to make the procedure as close in reality as possible to the usual procedure in the automobile industry. The reason is that in the automobile industry, rinsing with water usually takes place either by dip rinsing or spray rinsing. Rinsing was carried out in each case once by dipping for 2 minutes at room temperature in deionized water.

VIII. Drying, Filming and/or Crosslinking of the Secondary Coat:

Drying with filming in particular of the organic polymeric constituents:

1: Dried at 175° C. for 15 minutes in a drying cabinet with forced air and fresh-air supply with filming, since at the temperatures all examples gave a dry film which under the scanning electronmicroscope can no longer be resolved as a particulate coating.

Parallel investigations by scanning electronmicroscopy (SEM) made it clear that in accordance with the invention, coatings were formed from which it was possible for largely impervious or impervious coatings to be formed from the combination of the contacting with activating agent and through contacting of the activated surfaces of dispersions and/or formulations. The micrographs consistently showed homogenous coat formation, thus demonstrating a reliable, self-regulating, and readily controllable coating method.

If a secondary coat was formed on a thin activating coat which was not homogeneous and not impervious, the secondary coat, though thinner, was nevertheless formed homogeneously and imperviously. In certain of the experiments, coating took place only within a time of 2 or 3 minutes, although the selected 5-minute treatment time was retained, thus giving an end state of the secondary coat in 5 minutes' treatment time. The secondary coat formed was first rinsed and only thereafter dried. The rinsing of the secondary coat was used for removing excess substance of the aqueous composition, and impurities. Here it was ensured that the secondary coat has a few minutes' time prior to rinsing, within the treatment time, to allow satisfactory saturation of the polyelectrolyte with the organic matrix. In all of the experiments, 5 minutes were sufficient for this purpose. It is assumed that within this time the polyelectrolyte is enveloped with polymer, so that the secondary coat is formed rinse-resistantly. It was found that the secondary coats comprising modified polyelectrolyte were significantly more rinse-resistant than the secondary coats comprising unmodified polyelectrolyte. Nevertheless, the secondary coats comprising unmodified polyelectrolyte were sufficiently rinse-resistant for these experiments. Accordingly, the conditions are met to allow an electrodeposition coating process to be converted to an electroless process. Initial corrosion tests and adhesion tests demonstrate that the corrosion resistance and the paint adhesion of the coat system of the invention are within an order of magnitude fundamentally sufficient for the technical purpose. In the wide variety of experiments, it was possible to form secondary coats with a dry film thickness of up to 38 μm in 5 minutes' treatment time in each case, whereas the formation of an electrodeposition coat of around 20 μm took 10 to 20 minutes, with a high level of current consumption. As a result, it is possible, in an environmentally friendly way, to avoid high energy quantities and a costly and inconvenient plant engineering.

Tables for Examples B1-B12, B21-B31 and B34-45:

TABLE 1

Verification of the rinse resistance of the modified polyethyleneimine activation

| | Example | | | | | |
|---|---|---|---|---|---|---|
| | B1 | B2 | B3 | B4 | B5 | B6 |
| Substrate type No.: | 1 | 2 | 3 | 4 | 1 | 2 |
| Alkaline cleaning No.: | 1 | 1 | 1 | 1 | 1 | 1 |
| Activation | | | | | | |
| Activating agent No.: | 1 | 1 | 1 | 1 | 2 | 2 |
| Intermediate drying of the activating coat No.: | — | — | — | — | — | — |
| Rinse resistance: | no | no | no | no | no | no |
| XFA element amounts [mg/m$^2$] Si/Ti/Zr/Mn | —/—/—/— | —/—/—/— | —/—/—/— | —/—/—/— | —/—/—/— | —/—/—/— |
| SEM coat thickness dry film [μm] | 0 | 0 | 0 | 0 | 0 | 0 |
| Secondary coat | | | | | | |
| Secondary coat No.: | — | — | — | — | — | — |
| Rinse resistance 2: | — | — | — | — | — | — |
| Drying No.: | — | — | — | — | — | — |
| SEM coat thickness dry film [μm] | — | — | — | — | — | — |

| | Example | | | | | |
|---|---|---|---|---|---|---|
| | B7 | B8 | B9 | B10 | B11 | B12 |
| Substrate type No.: | 3 | 4 | 1 | 2 | 3 | 4 |
| Alkaline cleaning No.: | 1 | 1 | 1 | 1 | 1 | 1 |
| Activation | | | | | | |
| Activating agent No.: | 2 | 2 | 3 | 3 | 3 | 3 |
| Intermediate drying of the activating coat No.: | — | — | — | — | — | — |
| Rinse resistance: | no | no | yes | yes | yes | yes |
| XFA element amounts [mg/m$^2$] Si/Ti/Zr/Mn | —/—/—/— | —/—/—/— | 21/<1/82/149 | 18/<1/75/52 | 22/<1/82/>200 | 30/5/80/122 |
| SEM coat thickness dry film [μm] | — | — | 0.2 | 0.2 | 0.2 | 0.1 |

TABLE 1-continued

Verification of the rinse resistance of the modified polyethyleneimine activation Secondary coat

| | | | | | | |
|---|---|---|---|---|---|---|
| Secondary coat No.: | — | — | — | — | — | — |
| Rinse resistance 2: | — | — | — | — | — | — |
| Drying No.: | — | — | — | — | — | — |
| SEM coat thickness dry film [µm] | — | — | — | — | — | — |

TABLE 2

Inventive examples with polyethyleneimine and with intermediate drying in the case of unmodified polyethyleneimine

| | Example | | | | | | | | |
|---|---|---|---|---|---|---|---|---|---|
| | B21 | B22 | B23 | B24 | B25 | B26 | B27 | B28 | B29 |
| Substrate type No.: | 1-4 | 1-4 | 1-4 | 1-4 | 1-4 | 1-4 | 1-4 | 1-4 | 1-4 |
| Alkaline cleaning No.: | 1 | 1 | 1 | 1 | 1 | 1 | 1 | 1 | 1 |
| Activation | | | | | | | | | |
| Activating agent No.: | 1 | 2 | 3 | 1 | 2 | 3 | 1 | 2 | 3 |
| Intermediate drying of the activating coat No.: | 1 | 1 | — | 1 | 1 | — | 1 | 1 | — |
| Rinse resistance: | yes | yes | yes | yes | yes | yes | yes | yes | yes |
| XFA element amounts [mg/m$^2$] Si/Ti/Zr/Mn | —/—/—/— | —/—/—/— | —/—/—/— | —/—/—/— | —/—/—/— | —/—/—/— | —/—/—/— | —/—/—/— | —/—/—/— |
| SEM coat thickness dry film [µm] | 0.1-0.2 | 0.1-0.2 | 0.2 | 0.1-0.2 | 0.1-0.2 | 0.2 | 0.1-0.2 | 0.1-0.2 | 0.2 |
| Secondary coat | | | | | | | | | |
| Secondary coat No.: | | n(30); n = 1, 2 | | | n(20); n = 1, ... 11, 12 | | | n(10); n = 1, 2, 11, 12 | |
| Rinse resistance 2: | yes | yes | yes | yes | yes | yes | yes | yes | yes |
| Drying No.: | 1 | 1 | 1 | 1 | 1 | 1 | 1 | 1 | 1 |
| SEM coat thickness dry film [µm] | 3-6 | 4-7 | 5-10 | 10-15 | 10-15 | 11-16 | 23-30 | 23-30 | 25-31 |

TABLE 3

Additional inventive examples with modified polyethyleneimine, to show the correlating coat thicknesses of the activating coat and the secondary coat

| | Example | |
|---|---|---|
| | B30 | B31 |
| Substrate type No.: | 1, 2 | 1, 2 |
| Alkaline cleaning No.: | 1 | 1 |
| Activation | | |
| Activating agent No.: | 3 (blade-coated) | 3 (blade-coated) |
| Intermediate drying of the activating coat No.: | 3 | 3 |
| Rinse resistance: | yes | yes |
| XFA element amounts [mg/m$^2$] Si/Ti/Zr/Mn | —/—/—/— | —/—/—/— |
| SEM coat thickness dry film [µm] | 0.01-0.05 | 0.3-0.4 |
| Secondary coat | | |
| Secondary coat No.: | n(20); n = 1, 11 | |
| Rinse resistance 2: | yes | yes |
| Drying No.: | 1 | 1 |
| SEM coat thickness dry film [µm] | 3-5 | 20-25 |

TABLE 4

Inventive examples with modified polyelectrolytes and with intermediate drying

| | Example | | |
|---|---|---|---|
| | B34 | B35 | B36 |
| Substrate type No.: | 1-4 | 1-4 | 1-4 |
| Alkaline cleaning No.: | 1 | 1 | 1 |
| Activation | | | |
| Activating agent No.: | 3 | 3 | 3 |
| Intermediate drying of the activating coat No.: | 1 | 1 | 1 |
| Rinse resistance: | yes | yes | yes |
| XFA element amounts [mg/m$^2$] Si/Ti/Zr/Mn | —/—/—/— | —/—/—/— | —/—/—/— |
| SEM coat thickness dry film [µm] | 0.3 | 0.3 | 0.3 |
| Secondary coat | | | |
| Secondary coat No.: | n(30); n = 1, 2 | n(20); n = 1, 11 | n(10); n = 1, 11 |
| Rinse resistance 2: | yes | yes | yes |
| Drying No.: | 1 | 1 | 1 |
| SEM coat thickness dry film [µm] | 10-11 | 20-25 | 25-30 |

TABLE 5

Inventive examples with copolymers of vinylpyrrolidone and quaternary vinylimidazole and with intermediate drying

| | Example | | | |
|---|---|---|---|---|
| | B37 | B38 | B39 | B40 |
| Substrate type No.: | 1-4 | 1-4 | 1-4 | 1-4 |
| Alkaline cleaning No.: | 1 | 1 | 1 | 1 |
| Activation | | | | |
| Activating agent No.: | 6 | 7 | 8 | 9 |
| Intermediate drying of the activating coat No.: | 1 | 1 | 1 | 1 |
| Rinse resistance: | yes | yes | yes | yes |
| XFA element amounts [mg/m$^2$] Si/Ti/Zr/Mn | —/—/—/— | —/—/—/— | —/—/—/— | —/—/—/— |
| SEM coat thickness dry film [μm] | 0.03-0.04 | 0.03-0.04 | 0.01-0.02 | 0.01-0.02 |
| Secondary coat | | | | |
| Secondary coat No.: | | 1(20) | | |
| Rinse resistance 2: | yes | yes | yes | yes |
| Drying No.: | 1 | 1 | 1 | 1 |
| SEM coat thickness dry film [μm] | 1-2 | 2-3 | 1-2 | 2-3 |

TABLE 6

Inventive examples with pure and with modified polyvinylamines

| | Example | | |
|---|---|---|---|
| | B41 | B42 | B43 |
| Substrate type No.: | 1-4 | 1-4 | 1-4 |
| Alkaline cleaning No.: | 1 | 1 | 1 |
| Activation | | | |
| Activating agent No.: | 10 | 11 | 12 |
| Intermediate drying of the activating coat No.: | 1 | 1 | — |
| Rinse resistance: | yes | yes | yes |
| XFA element amounts [mg/m$^2$] Si/Ti/Zr/Mn | —/—/—/— | —/—/—/— | —/—/—/— |
| SEM coat thickness dry film [μm] | 0.08-0.1 | 0.08-0.1 | 0.1-0.2 |
| Secondary coat | | | |
| Secondary coat No.: | | 1(20) | |
| Rinse resistance 2: | yes | yes | yes |
| Drying No.: | 1 | 1 | 1 |
| SEM coat thickness dry film [μm] | 3-4 | 6-7 | 8-10 |

TABLE 7

Inventive examples with pure and with modified chitosan

| | Example | |
|---|---|---|
| | B44 | B45 |
| Substrate type No.: | 1-4 | 1-4 |
| Alkaline cleaning No.: | 1 | 1 |
| Activation | | |
| Activating agent No.: | 13 | 14 |
| Intermediate drying of the activating coat No.: | 1 | — |
| Rinse resistance: | yes | yes |
| XFA element amounts [mg/m$^2$] Si/Ti/Zr/Mn | —/—/—/— | —/—/—/— |
| SEM coat thickness dry film [μm] | 0.5-1.0 | 0.3-0.5 |
| Secondary coat | | |
| Secondary coat No.: | | 1(20) |
| Rinse resistance 2: | yes | yes |
| Drying No.: | 1 | 1 |
| SEM coat thickness dry film [μm] | 8-9 | 4-5 |

Tables for Comparative Examples VB13-VB20 and VB32-VB33;

TABLE 8

Verification that without an activating coat no secondary coat is formed, but also that, at the concentration and viscosity of the dispersion that are used, no secondary coat is formed, owing to a viscosity effect.

| | Example | | | | | | | |
|---|---|---|---|---|---|---|---|---|
| | VB13 | VB14 | VB15 | VB16 | VB17 | VB18 | VB19 | V20 |
| Substrate type No.: | 1 | 2 | 3 | 4 | 1 | 2 | 3 | 4 |
| Alkaline cleaning No.: | 1 | 1 | 1 | 1 | 1 | 1 | 1 | 1 |
| Activation | | | | | | | | |
| Activating agent No.: | — | — | — | — | — | — | — | — |
| Intermediate drying of the activating coat No.: | — | — | — | — | — | — | — | — |
| Rinse resistance: | — | — | — | — | — | — | — | — |

TABLE 8-continued

Verification that without an activating coat no secondary coat is
formed, but also that, at the concentration and viscosity of the dispersion that
are used, no secondary coat is formed, owing to a viscosity effect.

| | Example | | | | | | | |
|---|---|---|---|---|---|---|---|---|
| | VB13 | VB14 | VB15 | VB16 | VB17 | VB18 | VB19 | V20 |
| XFA element amounts [mg/m$^2$] Si/Ti/Zr/Mn | <1/<1/<1/17 | <1/<1/<1/5 | <1/<1/<1/78 | 10/6/<1/23 | <1/<1/<1/19 | <1/<1/<1/6 | <1/<1/<1/77 | 9/6/<1/20 |
| SEM coat thickness dry film [μm] | — | — | — | — | — | — | — | — |
| Secondary coat | | | | | | | | |
| Secondary coat No.: | 1(30) | 1(30) | 1(30) | 1(30) | 11(20) | 11(20) | 11(20) | 11(20) |
| Rinse resistance 2: | no | no | no | no | no | no | no | no |
| Drying No.: | 1 | 1 | 1 | 1 | 1 | 1 | 1 | 1 |
| SEM coat thickness dry film [μm] | 0 | 0 | 0 | 0 | 0 | 0 | 0 | 0 |

TABLE 9

Current maximum achievable dry film thicknesses of the total coat
system with silane activation of the technology according to
WO 2010/054985 A1

| | Example | |
|---|---|---|
| | VB32 | BB33 |
| Substrate type No.: | 1, 2 | 1, 2 |
| Alkaline cleaning No.: | 1 | 1 |
| Activation | | |
| Activating agent No.: | 4 | 5 |
| Intermediate drying of the activating coat No.: | — | — |
| Rinse resistance: | yes | yes |
| XFA element amounts [mg/m$^2$] Si/Ti/Zr/Mn | —/—/—/— | —/—/—/— |
| SEM coat thickness dry film [μm] | — | — |
| Secondary coat | | |
| Secondary coat No.: | n(20); n = 1, 11 | n(20); n = 1, 11 |
| Rinse resistance 2: | yes | yes |
| Drying No.: | 1 | 1 |
| SEM coat thickness dry film [μm] | 0.5 | 1-2 |

2.) Examples B46 and B47 for Cationic Salts as Activating Agents:

The same production sequence was selected under the same conditions as for the unmodified cationic polyelectrolytes. In step III., however, an activation based on cationic salts was used, comprising the activating substances necessary for the subsequent precipitation reactions and/or coagulation, and/or consisting of the substances. The activating coat was always formed over 2.5 minutes.

15: 1-molar aqueous solution in deionized water of calcium acetate.
16: 1-molar aqueous solution in deionized water of calcium formate.

These salt-containing activating coats were in this case dried at 40° C. for 15 minutes in a drying cabinet with forced air and fresh-air supply, before the coated substrates were rinsed as for the cationic polyelectrolytes.

To form a secondary coat, the dispersion 1 (20) was used, with a solids and active ingredient content of 20% by weight, as for the cationic polyelectrolytes. In this case, over 5 minutes' coating time at room temperature, a secondary coat was formed which had a dry film thickness in the range from 30 to 35 or from 59 to 64 μm, respectively. Here it was found that the cationic salts not only have fundamentally the same kind of effect as, for example, cationic polyelectrolytes, but are also able to form secondary coats of equal thickness or even of substantially greater thickness. The high or very high dry film thickness, respectively, is associated on the one hand with the divalent salt of the activating agent, and on the other hand possibly with the physicochemical properties of the formate.

TABLE 10 for B46 and B47:

| | Example | |
|---|---|---|
| | B46 | B47 |
| Substrate type: | 1-4 | 1-4 |
| Cleaning: | | |
| Alkaline cleaning No. | 1 | 1 |
| Activation: | | |
| Activating agent No. | 15 | 16 |
| Intermediate drying of the activating coat: | | |
| Drying No. | 1 | 1 |
| Properties after rinsing of the activating coat: | | |
| Rinse resistance | yes | yes |
| XFA element amounts mg/m$^2$: | | |
| Si | — | — |
| Ti | — | — |
| Zr | — | — |
| Mn | — | — |
| SEM coat thickness dry film [μm] | 0.1-0.2 | 0.1-0.2 |
| Secondary coating | | |
| Formulation/dispersion No. | 1(20) | 1(20) |
| Rinsing of the secondary coating | | |
| Rinse resistance | yes | yes |
| Drying/crosslinking of the coating | | |
| Drying No. | 1 | 1 |
| SEM coat thickness dry film [μm] | 30-35 | 59-64 |

3.) Examples B48 to B58 on the Use of Similarly Charged Activating Coats and Substances for a Secondary Coat:

These fundamental experiments serve to show that a cationic activating agent can also precipitate a cationically stabilized dispersion, and that an anionic activating agent can also precipitate an anionically stabilized dispersion. The production cycle used was fundamentally the same, and was used under the same conditions as for the modified polyelectrolytes.

With these experiments, surprisingly, it was possible to show that an activating coat whose activating substances are similarly charged to the substances of the aqueous composition for forming the secondary coat, for precipitating, for salting out and/or for depositing, and also for forming a secondary coat, is virtually identical to that in the case of an activating coat which is oppositely charged relative to the substances of the aqueous composition for forming the secondary coat and relative to precipitations and for forming a secondary coat. In this case, however, it has been refrained from forming a dry film in the case of the secondary coat, and so it was not possible to measure any dry film thicknesses.

Nevertheless it was possible to show in principle, with these initial experiments, that an activating coat may also serve successfully for similarly charged substances of the aqueous composition for forming the secondary coat. The precipitation experiments indicate that sufficient dry film thicknesses of the secondary coat can be generated, with, preferably, substances having chemical affinity being selected in each case and being combined in the method of the invention.

TABLE 11 for cationic-cationic treatment with examples B48 to B52: Cationic activating agent with cationically stabilized dispersion

| | Example | | | | |
|---|---|---|---|---|---|
| | B48 | B49 | B50 | B51 | B52 |
| Cationic activating agent | | | | | |
| Type No. | 1 | 2 | 13 | 15 | 16 |
| Cationically stabilized dispersion | | | | | |
| Type No. (conc. %) | 21 (20) | 21 (20) | 21 (20) | 21 (20) | 21 (20) |
| Precipitation intensity | | | | | |
| Strong | | | X | X | X |
| Weak | X | | | | |
| Almost no precipitation | | X | | | |

TABLE 12 for anionic-anionic treatment with examples B53 to B58: Anionic activating agent with anionically stabilized dispersion

| | Example | | | | | |
|---|---|---|---|---|---|---|
| | B53 | B54 | B55 | B56 | B57 | B58 |
| Anionic activating agent | | | | | | |
| Type No. Anionically stabilized dispersion | 21 | 22 | 25 | 26 | 28 | 30 |
| Type No. (conc. %) Precipitation intensity | 1 (20) | 1 (20) | 1 (20) | 1 (20) | 1 (20) | 1 (20) |
| Strong | X | | | | | X |
| Weak | | | X | X | | |

TABLE 12-continued for anionic-anionic treatment with examples B53 to B58: Anionic activating agent with anionically stabilized dispersion

| | Example | | | | | |
|---|---|---|---|---|---|---|
| | B53 | B54 | B55 | B56 | B57 | B58 |
| Almost no precipitation | | X | | | X | |

Strong: Activating agent precipitates 61-100% of the dispersion.
Weak: Activating agent precipitates 11-60% of the dispersion.
Almost no precipitation: Activating agent precipitates 0-10 percent of the dispersion.
The values were determined in each case gravimetrically.

The invention claimed is:

1. A method for coating a substrate, the method comprising the steps of:
   (I) providing the substrate;
   (II) optionally cleaning the substrate;
   (III) applying a first aqueous composition to form an activating coat on the substrate, the first aqueous composition comprising an activating agent comprising at least one cationic polyelectrolyte selected from the group consisting of a polyethyleneimine, a silane-modified polyethyleneimine, a polyethyleneimine modified with a silane compound, a polyvinylamine, a silane-modified polyvinylamine, a polyvinylamine modified with a silane compound, a chitosan, a silane-modified chitosan, and a chitosan modified with a silane compound;
   (IV) intermediate drying of the activating coat;
   (V) after the intermediate drying step, rinsing the activating coat, wherein when the activating coat is rinsed, at least a portion of the activating coat remains on the substrate;
   (VI) contacting and coating the remaining activating coat with a second aqueous composition to form an organic secondary coat, the second aqueous composition in at least one form selected from the group consisting of a solution, an emulsion and a suspension;
   (VII) optionally rinsing the organic secondary coat; and
   (VIII) drying the organic secondary coat;
   wherein the first aqueous composition is in the form selected from the group consisting of a solution, an emulsion and a suspension;
   wherein the second aqueous composition has constituents which can be precipitated, deposited, or salted out and which are stabilized in a manner selected from the group consisting of anionically, zwitterionically, sterically and cationically, where anionically stabilized and cationically stabilized constituents in the second aqueous composition do not adversely affect one another;
   wherein when a dry film is formed, the dry film comprises the organic secondary coat or the activating coat and the organic secondary coat, and the dry film has a thickness of at least 1 μm; and
   wherein the activating coat or/and the organic secondary coat is/are electrolessly applied to the substrate.

2. The method of claim 1, wherein to form the activating coat at least one modified polyelectrolyte is used which has been modified with at least one member selected from the group consisting of a silane, a silanol and a siloxane with a degree of condensation in the range from 1 to 30.

3. The method of claim 1, wherein the activating agent is prepared using (a) at least one member selected from the group consisting of a siliane, a silanol, and a siloxane to modify (b) a polyethyleneimine, polyvinylamine or chitosan, wherein the molar ratio of (a):(b) is in the range from about 2,500:1 to about 10,000:1.

4. The method of claim 1, wherein in step (VI) the second aqueous composition is a formulation or a dispersion, the second aqueous composition selected from the group consisting of:
A) anionically stabilized polymer particle dispersions,
B) anionically stabilized formulations,
C) sterically stabilized polymer particle dispersions,
D) sterically stabilized formulations,
E) zwitterionically stabilized polymer particle dispersions,
F) zwitterionically stabilized formulations
and mixtures thereof
or selected from the group consisting of the following aqueous compositions:
G) cationically stabilized polymer particle dispersions,
H) cationically stabilized formulations,
I) sterically stabilized polymer particle dispersions,
J) sterically stabilized formulations,
K) zwitterionically stabilized polymer particle dispersions,
L) zwitterionically stabilized formulations
and mixtures thereof.

5. The method of claim 1, wherein the contacting and coating during activating to form a secondary coat occurs in a dipping process.

6. The method of claim 1, wherein in step (I) the substrate is a metallic substrate, the metallic substrate selected from the group consisting of aluminum, iron, copper, magnesium, titanium, zinc and tin, or an alloy thereof containing a member selected from the group consisting of aluminum, iron, steel, copper, magnesium, nickel, titanium, zinc and tin.

7. The method of claim 1, wherein the substrate has been precoated and/or joined to a plastics component.

8. The method according to claim 1, wherein the activating agent is polyethyleneimine.

9. A method for coating a substrate, the method comprising the following steps:
(I) providing the substrate;
(II) optionally cleaning the substrate;
(III) applying an activating coat;
(IV) intermediately drying the activating coat;
(V) rinsing the activating coat;
(VI) coating the activating coat with a formulation or a dispersion to form an organic secondary coating;
(VII) rinsing the organic secondary coating;
(VIII) drying and/or crosslinking of the organic secondary coating;
wherein the activating coat is formed from a compound or mixture of compounds selected from the group consisting of chitosan, calcium acetate, calcium formate, and mixtures thereof; and
wherein the activating coat or/and the organic secondary coat is/are electrolessly applied to the substrate.

* * * * *